(12) United States Patent
Tabata et al.

(10) Patent No.: US 8,036,798 B2
(45) Date of Patent: Oct. 11, 2011

(54) CONTROLLER OF DRIVER FOR VEHICLE

(75) Inventors: Atsushi Tabata, Okazaki (JP); Yutaka Taga, Aichi-gun (JP); Yuji Inoue, Nisshin (JP); Atsushi Kamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 993 days.

(21) Appl. No.: 11/915,240

(22) PCT Filed: Jun. 14, 2006

(86) PCT No.: PCT/JP2006/312369
§ 371 (c)(1),
(2), (4) Date: Nov. 21, 2007

(87) PCT Pub. No.: WO2006/135095
PCT Pub. Date: Dec. 21, 2006

(65) Prior Publication Data
US 2009/0076694 A1    Mar. 19, 2009

(30) Foreign Application Priority Data
Jun. 14, 2005   (JP) ................... 2005-173760

(51) Int. Cl.
G06F 7/00 (2006.01)
F16H 48/06 (2006.01)

(52) U.S. Cl. ............ 701/51; 701/58; 475/149; 475/150; 475/153

(58) Field of Classification Search ............ 701/51, 701/58; 477/34, 37, 97; 475/198–199, 204, 475/207–208, 149–150, 153
See application file for complete search history.

(56) References Cited

U.S. PATENT DOCUMENTS

| | | | |
|---|---|---|---|
| 6,878,092 B1 | 4/2005 | Schustek et al. | |
| 6,953,409 B2 | 10/2005 | Schmidt et al. | |
| 6,960,152 B2 | 11/2005 | Aoki et al. | |
| 7,753,818 B2* | 7/2010 | Kamada et al. | 475/153 |
| 7,803,086 B2* | 9/2010 | Tabata et al. | 477/3 |
| 2003/0064854 A1 | 4/2003 | Kotani | |
| 2005/0205373 A1* | 9/2005 | Foster et al. | 192/18 A |
| 2006/0063628 A1* | 3/2006 | Sowul et al. | 475/5 |
| 2006/0111212 A9* | 5/2006 | Ai et al. | 475/5 |

(Continued)

FOREIGN PATENT DOCUMENTS

DE    100 01 436 A1    8/2000

(Continued)

*Primary Examiner* — Yonel Beaulieu
(74) *Attorney, Agent, or Firm* — Oblon, Spivak, McClelland, Maier & Neustadt, L.L.P.

(57) ABSTRACT

A control apparatus for a vehicular drive system arranged to electrically transmit a portion of an output force of an engine through an electric path. The control apparatus is configured to reduce loads of components associated with the electric path and to restrict a temperature rise of the components associated with the electric path, making it possible to reduce the required size of a cooling system. This is accomplished by placing a differential portion in a non-differential state or placing a switching clutch or switching brake in a partially engaged state when electrical energy through the electric path has increased to a thermal limit. As a result, the amount of generated electric energy is reduced, making it possible to restrict the temperature rise of the components associated with the electric path. Accordingly, the cooling system size can be reduced for these components.

42 Claims, 14 Drawing Sheets

U.S. PATENT DOCUMENTS

2008/0300761 A1 * 12/2008 Matsubara et al. ............ 701/61

FOREIGN PATENT DOCUMENTS

| | | |
|---|---|---|
| DE | 102 96 705 T5 | 12/2004 |
| JP | 11 217025 | 8/1999 |
| JP | 2000 2327 | 1/2000 |
| JP | 2000 341804 | 12/2000 |
| JP | 2000 346187 | 12/2000 |
| JP | 2002-335603 | 11/2002 |
| JP | 2003 220856 | 8/2003 |
| JP | 2003 301731 | 10/2003 |
| JP | 2004-28279 | 1/2004 |
| JP | 2004 50910 | 2/2004 |
| JP | 2005 273900 | 10/2005 |
| JP | 2006 46576 | 2/2006 |

* cited by examiner

| | C0 | C1 | C2 | B0 | B1 | B2 | B3 | SPEED RATIO | STEPPING RATIO |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | SPREAD 4.76 |
| R | | | ○ | | | | ○ | 3.209 | |
| N | ○ | | | | | | | | |

○ ENGAGED
◎ ENGAGED FOR STEP-VARIABLE SHIFTING, AND RELEASED FOR CONTINUOUSLY-VARIABLE SHIFTING

| | C0 | C1 | C2 | B0 | B1 | B2 | SPEED RATIO | STEPPING RATIO |
|---|---|---|---|---|---|---|---|---|
| 1st | ◎ | ○ | | | | ○ | 2.804 | 1.54 |
| 2nd | ◎ | ○ | | | ○ | | 1.531 | 1.53 |
| 3rd | ◎ | ○ | ○ | | | | 1.000 | 1.42 |
| 4th | | ○ | ○ | ◎ | | | 0.705 | SPREAD 3.977 |
| R | | | ○ | | | ○ | 2.393 | |
| N | ○ | | | | | | | |

○ ENGAGED
◎ ENGAGED FOR STEP-VARIABLE SHIFTING, AND RELEASED FOR CONTINUOUSLY-VARIABLE SHIFTING

CONTROLLER OF DRIVER FOR VEHICLE

TECHNICAL FIELD

The present invention relates to a vehicular drive system including a differential mechanism operable to perform a differential function and an electric motor, and more particularly to techniques for reducing the required size of the electric motor.

BACKGROUND ART

There is known a vehicular drive system including a differential mechanism operable to distribute an output of an engine to a first electric motor and an output shaft, and a second electric motor provided in a power transmitting path between the output shaft of the differential mechanism and vehicle drive wheels. Patent Document 1 discloses an example of such a vehicular drive system in the form of a hybrid vehicle drive system. In this hybrid drive system, the differential mechanism is constituted by a planetary gear set, which has a differential function to mechanically transmit a major portion of a vehicle drive force from the engine to the drive wheels, and to electrically transmit the remaining portion of the vehicle drive force of the engine from the first electric motor to the second electric motor through an electric path, so that the planetary gear set functions as a transmission the speed ratio of which is continuously variable, for instance, as an electrically controlled continuously variable transmission. The vehicular drive system is controlled by a control apparatus to drive the vehicle with the engine being held in an optimum operating state so as to improve the fuel economy of the vehicle.

Patent Document 1: JP-2003-301731 A

Generally, a continuously variable transmission is known as a device to improve the vehicle economy of the vehicle, while a gear type power transmitting device such as a step-variable automatic transmission is known as a device having a high power transmitting efficiency. However, there is not available a power transmitting mechanism which has advantages of both of those two devices. For example, the hybrid vehicle drive system as disclosed in the above-identified Patent Document 1 has an electric path through which the electric energy is transmitted from the first electric motor to the second electric motor, that is, a power transmitting path for transmitting a portion of the vehicle drive force as the electric energy, so that the required size of the first electric motor increases with an increase of the required output of the engine, resulting in a consequent increase of the required size of the second electric motor which is operated by the electric energy received from the first electric motor, whereby the required overall size of the drive system is unfavorably increased. Further, the hybrid vehicle drive system has a risk of deterioration of the fuel economy in some running condition of the vehicle such as a high-speed running, due to the conversion of a portion of the engine output into an electric energy subsequently used for driving the drive wheels. A similar problem exists where the above-described power transmitting mechanism is a continuously variable transmission such as a transmission the speed ratio of which is electrically variable, for instance, a so-called "electric CVT".

In the hybrid vehicle drive system as disclosed in the above-identified publication, the first electric motor is required to receive a reaction torque corresponding to the engine torque so that the power distributing mechanism can function as the electric CVT. Accordingly, during a high-load low-speed running of the vehicle, for instance, during a vehicle running while towing a trailer, the amount of generation of an electric energy by the first electric motor is increased so that the amount of electric energy to be transmitted through the electric path is increased, resulting in an increase of the output of the second electric motor. Such a high-load low-speed running of the vehicle continued for a long time may cause a considerable rise of the temperatures of the first and second electric motors due to an increase of the amount of electric energy, and an increase of loads of components associated with the electric path for transmission of the electric energy generated by the first electric motor to the second electric motor, which converts the electric energy into a mechanical energy. Those temperature rise and increase of the loads give rise to deterioration of the function and durability of the components associated with the electric path which includes the first and second electric motors.

Therefore, it is required to increase the cooling capacity of the vehicular drive system, for the purpose of avoiding a temperature rise of cooling water in the cooling system for cooling the first and second electric motors, for example. It is also required to increase the capacities of the components associated with the electric path, for withstanding the loads due to an increase of the amount of generation of the electric energy. Meeting these requirements may cause increases of the sizes and weights of the components of the cooling system and the components associated with the electric path, unfavorably leading to an increase of the cost of manufacture of the vehicular drive system.

The present invention was made in view of the background art descried above. It is an object of this invention to provide a control apparatus for a vehicular drive system including a differential mechanism operable to distribute an output of an engine to a first electric motor and a power transmitting member, and a second electric motor provided in a power transmitting path between the power transmitting member and a wheel of a vehicle, and to electrically transmit a portion of a vehicle drive force such that an electric energy generated by the first electric motor is transmitted through an electric path to the second electric motor and converted into a mechanical energy by the second electric motor, which control apparatus makes it possible to reduce loads of components associated with the electric path or restrict a temperature rise of those components, for thereby permitting size reduction of a cooling system of the vehicular drive system.

DISCLOSURE OT THE INVENTION

According to the present invention there is provided a control apparatus for (a) a vehicular drive system including a continuously-variable transmission portion operable as an electrically controlled continuously variable transmission and having a differential mechanism operable to distribute an output of an engine to a first electric motor and a power transmitting member, and a second electric motor disposed in a power transmitting path between the power transmitting member and a drive wheel of a vehicle, the control apparatus being characterized by comprising (b) a differential limiting device provided in the differential mechanism and operable to limit a differential function of the differential mechanism, for limiting an operation of the continuously-variable transmission portion as the electrically controlled continuously variable transmission, and (c) electric-energy restriction control means for placing the differential mechanism in a non-differential state or placing the differential limiting device in a partially power transmitting state, to thereby restrict an amount of electric energy transmitted through the continuously-variable transmission portion, when the amount of transmission of the electric energy through the continuously-variable transmission portion operating as the electrically controlled continuously variable transmission has increased to a predetermined thermal limit.

According to the control apparatus constructed as described above, the continuously-variable transmission portion of the vehicular drive system is switchable by the differential limiting device, between a differential state in which the differential mechanism has the differential function without a limitation, that is, a continuously-variable shifting state in which the continuously-variable transmission portion is operable as the electrically controlled continuously variable transmission, and a non-differential state such as a locked state in which the differential mechanism does not have the differential function, that is, a non-continuously-variable shifting state in which the continuously-variable transmission portion is not operable as the electrically controlled continuously variable transmission. Accordingly, the vehicular drive system has both an advantage of improved fuel economy provided by a transmission the speed ratio of which is electrically variable, and an advantage of high power transmitting efficiency provided by a gear type power transmitting device constructed for mechanical transmission of power.

When the continuously-variable transmission portion is placed in the continuously-variable shifting state in a normal output state of the engine during a low-speed or medium-speed running or a low-output or medium-output running of the vehicle, for example, the fuel economy of the vehicle is improved. When the continuously-variable transmission portion is placed in the non-continuously-variable shifting state during a high-speed running of the vehicle, the output of the engine is transmitted to the drive wheel primarily through the mechanical power transmitting path, so that the fuel economy is improved owing to reduction of a loss of conversion of a mechanical energy into an electric energy, which would take place when the continuously-variable transmission portion is operated as a transmission the speed ratio of which is electrically variable. Where the continuously-variable transmission portion is placed in the non-continuously-variable shifting state during a high-output running state of the vehicle, the continuously-variable transmission portion is operated as a transmission the speed ratio of which is electrically variable, only when the vehicle speed or output is relatively low or medium, so that the required amount of electric energy generated by the electric motor, that is, the maximum amount of electric energy that must be transmitted from the electric motor can be reduced, making it possible to minimize the required size of the electric motor, and the required size of the vehicular drive system including the electric motor.

In the vehicular drive system including the continuously-variable transmission portion the operation of which as the electrically controlled continuously variable transmission can be limited, the differential mechanism is placed in the non-differential state or the differential limiting device is placed in the partially power transmitting state, under the control of the electric-energy restriction control means, to restrict the amount of electric energy transmitted through the continuously-variable transmission portion, when the amount of transmission of the electric energy through the continuously-variable transmission portion has increased to the thermal limit while the continuously-variable transmission portion is operated as the electrically controlled continuously variable transmission. Accordingly, the differential limiting device can receive the reaction torque corresponding to the output torque of the engine (hereinafter referred to as "engine torque"), so that the reaction torque that must be received by the first electric motor to enable the continuously-variable transmission portion to operate as the electrically controlled continuously variable transmission can be restricted. As a result, the amount of generation of electricity by the first electric motor is reduced, and the amount of the electric energy transmitted through the electric path is accordingly reduced, making it possible to restrict temperature rises of the components associated with the electric path including the first and second electric motors, so that the required size of a cooling system for cooling those components can be reduced. Further, the loads of the components associated with the electric path including the first and second electric motors can be reduced, so that the durability of the components associated with the electric path including the first and second electric motors can be improved.

In another aspect of the invention, the power transmitting path is partially constituted by a transmission portion, and the electric-energy restriction control means is configured to command the transmission portion to perform a shift-down action when the differential mechanism cannot be placed in the non-differential state or when the differential limiting device cannot be placed in the partially power transmitting state. In this case, the output torque of the transmission portion is increased after the shift-down action, by an amount corresponding to an increase of the speed ratio of the transmission portion, even when the output torque of the continuously-variable transmission portion is kept constant before and after the shift-down action. In other words, the output torque of the continuously-variable transmission portion is reduced after the shift-down action, by the amount corresponding to the increase of the speed ratio of the transmission portion, provided the output torque of the transmission portion is kept constant before and after the shift-down action. Accordingly, the engine torque can be reduced after the shift-down action, and the reaction torque which corresponds to the engine torque and which must be received by the first electric motor can be reduced. Therefore, the amount of generation of electricity by the first electric motor is reduced, and the amount of transmission of the electric energy transmitted through the electric path is accordingly reduced, so that the temperature rise of the components associated with the electric path including the first and second electric motors is restricted, whereby the required size of the cooling system for cooling those components can be reduced. Further, the loads of the components associated with the components associated with the electric path including the first and second electric motors can be reduced, so that the durability of the components associated with the electric path including the first and second electric motors can be improved.

According to the invention as the electric-energy restriction control means is configured to reduce an output torque of the engine when the differential mechanism cannot be placed in the non-differential state or when the differential limiting device cannot be placed in the partially power transmitting state, and when the shift-down action of the transmission portion cannot be performed. In this case, the reaction torque which corresponds to the engine torque and which must be received by the first electric motor can be reduced. Accordingly, the amount of generation of electricity by the first electric motor is reduced, and the amount of transmission of the electric energy through the electric path is accordingly reduced, so that the temperature rise of the components associated with the electric path including the first and second electric motors is restricted, and the required size of the cooling system for cooling those components can be reduced. Further, the loads of the components associated with the electric path including the first and second electric motors can be reduced, so that the durability of the components associated with the electric path including the first and second electric motors can be improved.

According to the invention there is provided a control apparatus for (a) a vehicular drive system including a continuously-variable transmission portion operable as an electrically controlled continuously variable transmission and having a differential mechanism operable to distribute an output of an engine to a first electric motor and a power transmitting member, and a second electric motor disposed in a power transmitting path between the power transmitting member and a drive wheel of a vehicle, and further including a transmission portion which constitutes a part of the power transmitting path, the control apparatus being characterized by comprising (b) electric-energy restriction control means for commanding the transmission portion to be shifted down, to thereby restrict an amount of electric energy transmitted through the continuously-variable transmission portion, when the amount of transmission of the electric energy through the continuously-variable transmission portion operating as the electrically controlled continuously variable transmission has increased to a predetermined thermal limit.

According to the control apparatus constructed as described above, the electric-energy restriction control means commands the transmission portion to perform the shift-down action to restrict the amount of electric energy transmitted through the continuously-variable transmission, when the amount of transmission of the electric energy through the continuously-variable transmission portion operating as the electrically controlled continuously variable transmission has increased to the predetermined thermal limit. In this case, the output torque of the transmission portion is increased after the shift-down action, by an amount corresponding to an increase of the speed ratio of the transmission portion, even when the output torque of the continuously-variable transmission portion is kept constant before and after the shift-down action. In other words, the output torque of the continuously-variable transmission portion is reduced after the shift-down action, by the amount corresponding to the increase of the speed ratio of the transmission portion, provided the output torque of the transmission portion is kept constant before and after the shift-down action. Accordingly, the engine torque can be reduced after the shift-down action, and the reaction torque which corresponds to the engine torque and which must be received by the first electric motor can be reduced. Therefore, the amount of generation of electricity by the first electric motor is reduced, and the amount of transmission of the electric energy transmitted through the electric path is accordingly reduced, so that the temperature rise of the components associated with the electric path including the first and second electric motors is restricted, whereby the required size of the cooling system for cooling those components can be reduced. Further, the loads of the electric path including the first and second electric motors can be reduced, so that the durability of the components associated with the electric path including the first and second electric motors can be improved.

According to the present invention there is provided a control apparatus for (a) a vehicular drive system including a differential portion operable as an electrically controlled continuously variable transmission and having a differential mechanism operable to distribute an output of an engine to a first electric motor and a power transmitting member, and a second electric motor disposed in a power transmitting path between the power transmitting member and a drive wheel of a vehicle, the control apparatus being characterized by comprising (b) a differential limiting device provided in the differential mechanism and operable to limit a differential function of the differential mechanism, for limiting an operation of the continuously-variable transmission portion as the electrically controlled continuously variable transmission, and (c) electric-energy restriction control means for placing the differential mechanism in a non-differential state or placing the differential limiting device in a partially power transmitting state, to thereby restrict an amount of electric energy transmitted through the differential portion, when the amount of transmission of the electric energy through the differential portion operating as the electrically controlled continuously variable transmission has increased to a predetermined thermal limit.

In the vehicular drive system constructed as described above, the differential portion of the vehicular drive system is switchable by the differential limiting device, between a differential state in which the differential mechanism has the differential function without a limitation, that is, a continuously-variable shifting state in which the differential portion is operable as the electrically controlled continuously variable transmission, and a non-differential state such as a locked state in which the differential mechanism does not have the differential function, that is, a non-continuously-variable shifting state in which the differential portion is not operable as the electrically controlled continuously variable transmission. Accordingly, the vehicular drive system has both an advantage of improved fuel economy provided by a transmission the speed ratio of which is electrically variable, and an advantage of high power transmitting efficiency provided by a gear type power transmitting device constructed for mechanical transmission of power.

When the differential portion is placed in the continuously-variable shifting state in a normal output state of the engine during a low-speed or medium-speed running or a low-output or medium-output running of the vehicle, for example, the fuel economy of the vehicle is improved. When the differential portion is placed in the non-continuously-variable shifting state during a high-speed running of the vehicle, the output of the engine is transmitted to the drive wheel primarily through the mechanical power transmitting path, so that the fuel economy is improved owing to reduction of a loss of conversion of a mechanical energy into an electric energy, which would take place when the differential portion is operated as a transmission the speed ratio of which is electrically variable. Where the differential portion is placed in the non-continuously-variable shifting state during a high-output running state of the vehicle, the differential portion is operated as a transmission the speed ratio of which is electrically variable, only when the vehicle speed or output is relatively low or medium, so that the required amount of electric energy generated by the electric motor, that is, the maximum amount of electric energy that must be transmitted from the electric motor can be reduced, making it possible to minimize the required size of the electric motor, and the required size of the vehicular drive system including the electric motor.

In the vehicular drive system including the differential portion the operation of which as the electrically controlled continuously variable transmission can be limited, the differential mechanism is placed in the non-differential state or the differential limiting device is placed in the partially power transmitting state, under the control of the electric-energy restriction control means, to restrict the amount of electric energy transmitted through the differential portion, when the amount of transmission of the electric energy through the differential portion has increased to the thermal limit while the differential portion is operated as the electrically controlled continuously variable transmission. Accordingly, the differential limiting device can receive the reaction torque corresponding to the engine torque, so that the reaction torque that must be received by the first electric motor to enable the differential portion to operate as the electrically controlled continuously variable transmission can be restricted. As a result, the amount of generation of electricity by the first electric motor is reduced, and the amount of the electric energy transmitted through the electric path is accordingly reduced, making it possible to restrict temperature rises of the components associated with the electric path including the first and second electric motors, so that the required size of a cooling system for cooling those components can be reduced. Further, the loads of the components associated with the electric path including the first and second electric motors can be reduced, so that the durability of the components associated with the electric path including the first and second electric motors can be improved.

According to the invention the power transmitting path is partially constituted by a transmission portion, and the electric-energy restriction control means is configured to command the transmission portion to perform a shift-down action when the differential mechanism cannot be placed in the non-differential state or when the differential limiting device cannot be placed in the partially power transmitting state. In this case, the output torque of the transmission portion is increased after the shift-down action, by an amount corresponding to an increase of the speed ratio of the transmission portion, even when the output torque of the differential portion is kept constant before and after the shift-down action. In other words, the output torque of the differential portion is reduced after the shift-down action, by the amount corresponding to the increase of the speed ratio of the transmission portion, provided the output torque of the transmission portion is kept constant before and after the shift-down action. Accordingly, the engine torque can be reduced after the shift-down action, and the reaction torque which corresponds to the engine torque and which must be received by the first electric motor can be reduced. Therefore, the amount of generation of electricity by the first electric motor is reduced, and the amount of transmission of the electric energy transmitted through the electric path is accordingly reduced, so that the temperature rise of the components associated with the electric path including the first and second electric motors is restricted, whereby the required size of the cooling system for cooling those components can be reduced. Further, the loads of the components associated with the components associated with the electric path including the first and second electric motors can be reduced, so that the durability of the components associated with the electric path including the first and second electric motors can be improved.

In another aspect of the invention the electric-energy restriction control means is configured to reduce an output torque of the engine when the differential mechanism cannot be placed in the non-differential state or when the differential limiting device cannot be placed in the partially power transmitting state, and when the shift-down action of the transmission portion cannot be performed. In this case, the reaction torque which corresponds to the engine torque and which must be received by the first electric motor can be reduced. Accordingly, the amount of generation of electricity by the first electric motor is reduced, and the amount of transmission of the electric energy through the electric path is accordingly reduced, so that the temperature rise of the components associated with the electric path including the first and second electric motors is restricted, and the required size of the cooling system for cooling those components can be reduced. Further, the loads of the components associated with the electric path including the first and second electric motors can be reduced, so that the durability of the components associated with the electric path including the first and second electric motors can be improved.

According to the invention there is provided a control apparatus for (a) a vehicular drive system including a differential portion operable as an electrically controlled continuously variable transmission and having a differential mechanism operable to distribute an output of an engine to a first electric motor and a power transmitting member, and a second electric motor disposed in a power transmitting path between the power transmitting member and a drive wheel of a vehicle, and further including a transmission portion which constitutes a part of the power transmitting path, the control apparatus being characterized by comprising (b) electric-energy restriction control means for commanding the transmission portion to be shifted down, to thereby restrict an amount of electric energy transmitted through the differential portion, when the amount of transmission of the electric energy through the differential portion operating as the electrically controlled continuously variable transmission has increased to a predetermined thermal limit.

According to the control apparatus constructed as described above, the electric-energy restriction control means commands the transmission portion to perform the shift-down action to restrict the amount of electric energy transmitted through the differential portion, when the amount of transmission of the electric energy through the differential portion operating as the electrically controlled continuously variable transmission has increased to the predetermined thermal limit. In this case, the output torque of the transmission portion is increased after the shift-down action, by an amount corresponding to an increase of the speed ratio of the transmission portion, even when the output torque of the differential portion is kept constant before and after the shift-down action. In other words, the output torque of the differential portion is reduced after the shift-down action, by the amount corresponding to the increase of the speed ratio of the transmission portion, provided the output torque of the transmission portion is kept constant before and after the shift-down action. Accordingly, the engine torque can be reduced after the shift-down action, and the reaction torque which corresponds to the engine torque and which must be received by the first electric motor can be reduced. Therefore, the amount of generation of electricity by the first electric motor is reduced, and the amount of transmission of the electric energy transmitted through the electric path is accordingly reduced, so that the temperature rise of the components associated with the electric path including the first and second electric motors is restricted, whereby the required size of the cooling system for cooling those components can be reduced. Further, the loads of the components associated with the components associated with the electric path including the first and second electric motors can be reduced, so that the durability of the components associated with the electric path including the first and second electric motors can be improved.

According to the invention it is determined that the above-indicated amount of transmission of the electric energy has increased to the predetermined thermal limit, when at least one of coil temperatures of the first and second electric motors is higher than a predetermined upper limit. In this case, it is possible to easily determine whether the amount of transmission of the electric energy through the continuously-variable transmission portion or differential portion has increased to the thermal limit, that is, whether the amount of generation of electricity by the continuously-variable transmission portion or differential portion has exceeded a permissible maximum value.

According to the invention a determination as to whether the above-indicated amount of transmission of the electric energy has increased to the predetermined thermal limit or not is made on the basis of an estimated value of the at least one of the coil temperatures at a moment which is a predetermined length of time after a present moment.

According to the invention it is determined that the above-indicated amount of transmission of the electric energy has increased to the predetermined thermal limit, when a temperature of a cooling fluid for cooling at least one of the first and second electric motors is higher than a predetermined upper limit. In this case, it is possible to easily determine whether the amount of transmission of the electric energy through the continuously-variable transmission portion or differential portion has increased to the thermal limit, that is, whether the amount of generation of electricity by the continuously-variable transmission portion or differential portion has exceeded a permissible maximum value.

According to the invention a determination as to whether the above-indicated amount of transmission of the electric energy has increased to the predetermined thermal limit or not is made on the basis of an estimated value of the temperature of the cooling fluid at a moment which is a predetermined length of time after a present moment.

Preferably, the control apparatus for the vehicular drive system further includes a differential limiting device provided in the differential mechanism and operable to limit a differential function of the differential mechanism, for limiting an operation of the continuously-variable transmission portion as the electrically controlled continuously variable transmission. In this case, the continuously-variable transmission portion of the vehicular drive system is switchable by the differential limiting device, between a differential state in which the differential mechanism has the differential function without a limitation, that is, a continuously-variable shifting state in which the continuously-variable transmission portion is operable as the electrically controlled continuously variable transmission, and a non-differential state such as a locked state in which the differential mechanism does not have the differential function, that is, a non-continuously-variable shifting state in which the continuously-variable transmission portion is not operable as the electrically controlled continuously variable transmission. Accordingly, the vehicular drive system has both an advantage of improved fuel economy provided by a transmission the speed ratio of which is electrically variable, and an advantage of high power transmitting efficiency provided by a gear type power transmitting device constructed for mechanical transmission of power.

When the continuously-variable transmission portion is placed in the continuously-variable shifting state in a normal output state of the engine during a low-speed or medium-speed running or a low-output or medium-output running of the vehicle, for example, the fuel economy of the vehicle is improved. When the continuously-variable transmission portion is placed in the non-continuously-variable shifting state during a high-speed running of the vehicle, the output of the engine is transmitted to the drive wheel primarily through the mechanical power transmitting path, so that the fuel economy is improved owing to reduction of a loss of conversion of a mechanical energy into an electric energy, which would take place when the continuously-variable transmission portion is operated as a transmission the speed ratio of which is electrically variable. Where the continuously-variable transmission portion is placed in the non-continuously-variable shifting state during a high-output running state of the vehicle, the continuously-variable transmission portion is operated as a transmission the speed ratio of which is electrically variable, only when the vehicle speed or output is relatively low or medium, so that the required amount of electric energy generated by the electric motor, that is, the maximum amount of electric energy that must be transmitted from the electric motor can be reduced, making it possible to minimize the required size of the electric motor, and the required size of the vehicular drive system including the electric motor.

Preferably, the control apparatus for the vehicular drive system further includes a differential limiting device provided in the differential mechanism and operable to limit a differential function of the differential mechanism, for limiting an operation of the differential portion as the electrically controlled continuously variable transmission. In this case, the differential portion of the vehicular drive system is switchable by the differential limiting device, between a differential state in which the differential mechanism has the differential function without a limitation, that is, a continuously-variable shifting state in which the differential portion is operable as the electrically controlled continuously variable transmission, and a non-differential state such as a locked state in which the differential mechanism does not have the differential function, that is, a non-continuously-variable shifting state in which the differential portion is not operable as the electrically controlled continuously variable transmission. Accordingly, the vehicular drive system has both an advantage of improved fuel economy provided by a transmission the speed ratio of which is electrically variable, and an advantage of high power transmitting efficiency provided by a gear type power transmitting device constructed for mechanical transmission of power.

When the differential portion is placed in the continuously-variable shifting state in a normal output state of the engine during a low-speed or medium-speed running or a low-output or medium-output running of the vehicle, for example, the fuel economy of the vehicle is improved. When the differential portion is placed in the non-continuously-variable shifting state during a high-speed running of the vehicle, the output of the engine is transmitted to the drive wheel primarily through the mechanical power transmitting path, so that the fuel economy is improved owing to reduction of a loss of conversion of a mechanical energy into an electric energy, which would take place when the differential portion is operated as a transmission the speed ratio of which is electrically variable. Where the differential portion is placed in the non-continuously-variable shifting state during a high-output running state of the vehicle, the differential portion is operated as a transmission the speed ratio of which is electrically variable, only when the vehicle speed or output is relatively low or medium, so that the required amount of electric energy generated by the electric motor, that is, the maximum amount of electric energy that must be transmitted from the electric motor can be reduced, making it possible to minimize the required size of the electric motor, and the required size of the vehicular drive system including the electric motor.

Preferably, the differential limiting device is operable to place the continuously-variable transmission portion in a continuously-variable shifting state in which the continuously-variable transmission portion is operable as the electrically controlled continuously variable transmission, by placing the differential mechanism in a differential state in which the differential mechanism has the differential function, and in a non-continuously-variable shifting state in which the continuously-variable transmission portion is not operable as the electrically controlled continuously variable transmission, by placing the differential mechanism in a non-differential state (e.g., locked state) in which the differential mechanism does not have the differential function. In this case, the continuously-variable transmission portion is switchable between the continuously-variable shifting state and the non-continuously-variable shifting state.

Preferably, the differential limiting device is operable to place the differential portion in a continuously-variable shifting state in which the differential portion is operable as the electrically controlled continuously variable transmission, by placing the differential mechanism in a differential state in which the differential mechanism has the differential function, and in a non-continuously-variable shifting state in which the differential portion is not operable as the electrically controlled continuously variable transmission, by placing the differential mechanism in a non-differential state (e.g., locked state) in which the differential mechanism does not have the differential function. In this case, the differential portion is switchable between the continuously-variable shifting state and the non-continuously-variable shifting state.

Preferably, the differential mechanism has a first element connected to the engine, a second element connected to the first electric motor, and a third element connected to the power transmitting member, and the differential limiting device permits the first through third elements to be rotated relative to each other (e.g., permits at least the second and third elements to be rotated at respective different speeds), for placing the differential mechanism in the differential state, and inhibits at least the second and third elements from being rotated at the respective different speeds (e.g., permits the first through third elements to be rotated as a unit or inhibits rotation of the second element), for placing the differential mechanism in the non-differential or locked state. In this case, the differential mechanism is switchable between the differential and non-differential states.

Preferably, the differential limiting device includes a clutch connecting at least two of the first through third elements to each other, for rotating the first through third elements as a unit, and/or a brake connecting the second element to a stationary member, for inhibiting the rotation of the second element. In this case, the differential mechanism can be easily switchable between the differential and non-differential states.

Preferably, the clutch and the brake are released to place the differential mechanism in the differential state in which the first through third elements are rotatable relative to each other to enable the differential mechanism to operate as an electrically controlled differential device, and the clutch is engaged to enable the differential mechanism to operate as a transmission having a speed ratio of 1, while the brake is engaged to enable the differential mechanism to operate as a speed increasing device having a speed ratio smaller than 1. In this case, the differential mechanism which is switchable between the differential and non-differential states is operable as a transmission having at least one fixed speed ratio.

Preferably, the differential mechanism is constituted by a planetary gear set including a carrier which functions as the first element, a sun gear which functions as the second element, and a ring gear which functions as the third element. In this case, the required axial dimension of the differential mechanism is reduced, and the differential mechanism constituted by the single planetary gear set is simple in construction.

Preferably, the planetary gear set indicated above is a single-pinion type planetary gear set. In this case, the required axial dimension of the differential mechanism is reduced, and the differential mechanism constituted by the single planetary gear set is simple in construction.

Preferably, a transmission portion is provided in the power transmitting path between the power transmitting member and the drive wheel. In this case, the vehicular drive system has an overall speed ratio defined by a speed ratio of the continuously-variable transmission portion and a speed ratio of the transmission portion, and the vehicle drive force is obtained over a wide range of the speed ratio, owing to a change of the speed ratio of the transmission portion, so that the operating efficiency of the continuously-variable transmission portion operating as the electrically controlled continuously variable transmission is further improved. Where the second electric motor is connected to the power transmitting member, and the transmission portion is a speed reducing transmission the speed ratio is higher than 1, the output torque of the second electric motor may be made lower than the torque of the output shaft of the transmission portion, so that the required size of the second electric motor can be reduced. It is noted that the continuously-variable transmission portion placed in the continuously-variable shifting state and the transmission portion cooperate to constitute a continuously variable transmission, and the continuously-variable transmission portion placed in the non-continuously-variable shifting state and the transmission portion cooperate to constitute a step-variable transmission.

Preferably, a transmission portion is provided in the power transmitting path between the power transmitting member and the drive wheel. In this case, the vehicular drive system has an overall speed ratio defined by a speed ratio of the differential portion and a speed ratio of the transmission portion, and the vehicle drive force is obtained over a wide range of the speed ratio, owing to a change of the speed ratio of the transmission portion, so that the operating efficiency of the differential portion operating as the electrically controlled continuously variable transmission is further improved. Where the second electric motor is connected to the power transmitting member, and the transmission portion is a speed reducing transmission the speed ratio is higher than 1, the output torque of the second electric motor may be made lower than the torque of the output shaft of the transmission portion, so that the required size of the second electric motor can be reduced. It is noted that the differential portion placed in the continuously-variable shifting state and the transmission portion cooperate to constitute a continuously variable transmission, and the differential portion placed in the non-continuously-variable shifting state and the transmission portion cooperate to constitute a step-variable transmission.

Preferably, the transmission portion is a step-variable automatic transmission. In this case, a shifting action of the transmission portion causes a stepping or non-continuous change of the overall speed ratio, that is, a higher change of the overall speed ratio. Accordingly, the vehicular drive system can function not only as a continuously variable transmission suitable for a smooth change of the vehicle drive torque, but also as a step-variable transmission suitable for a stepping change of the speed ratio and a rapid change of the vehicle drive torque.

EXPLANATION OF REFERENCE SIGNS 10, 70: Transmission mechanism (Drive system)
11: Differential portion (Continuously-variable transmission portion)
16: Power distributing mechanism (Differential mechanism)
18: Power transmitting member
20: Automatic transmission portion (Transmission portion)
38: Drive wheels
40: Electronic control device (Control device)
84: Electric-energy restricting control means
M1: First electric motor
M2: Second electric motor
C0: Switching clutch (Differential limiting device)
B0: Switching brake (Differential limiting device)

BEST MODE FOR CARRYING OUT THE INVENTION

The embodiments of this invention will be described in detail by reference to the drawings.

Embodiment 1

Figures 1, 2:
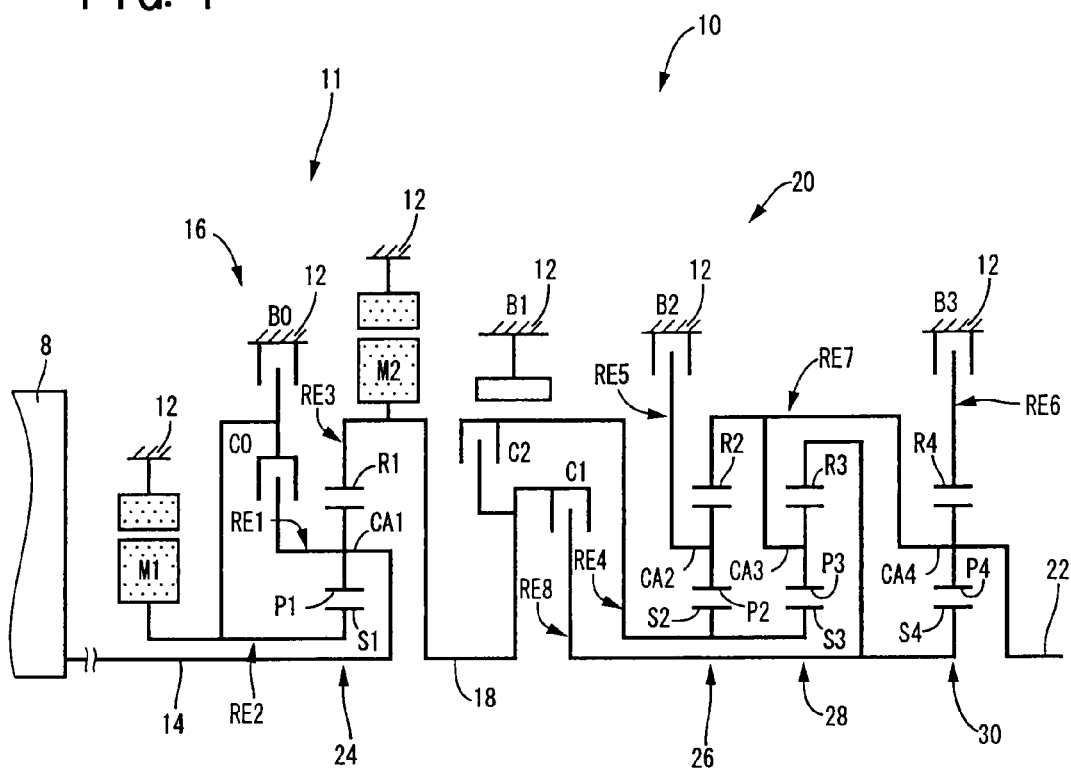
FIG. 1 is a schematic view showing an arrangement of a drive system of a hybrid vehicle according to one embodiment of the present invention.
FIG. 2 is a table indicating shifting actions of the hybrid vehicle drive system of FIG. 1 in a selected one of a continuously-variable shifting state and a step-variable shifting state, in relation to different combinations of operating states of hydraulically operated frictional coupling devices to effect the respective shifting actions.
Figure 5:
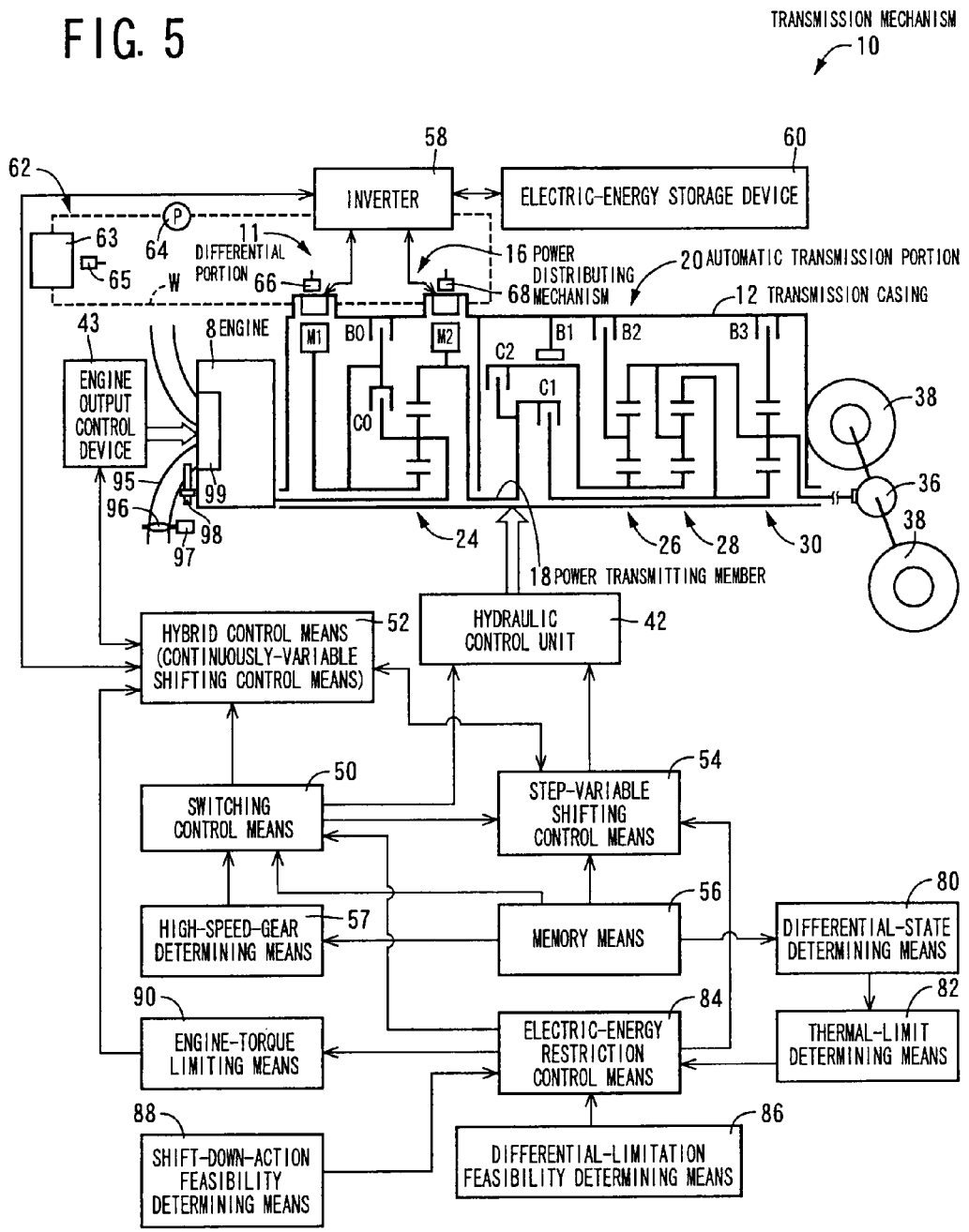
FIG. 5 is a functional block diagram illustrating major control functions of the electronic control device of FIG. 4.

Referring to the schematic view of FIG. 1, there is shown a transmission mechanism 10 constituting a part of a drive system for a hybrid vehicle, which drive system is controlled by a control apparatus according to one embodiment of this invention. In FIG. 1, the transmission mechanism 10 includes: an input rotary member in the form of an input shaft 14; a continuously-variable transmission portion in the form of a differential portion 11 connected to the input shaft 14 either directly, or indirectly via a pulsation absorbing damper (vibration damping device) not shown; a transmission portion functioning in the form of an automatic transmission portion 20 disposed in a power transmitting path between the differential portion 11 and drive wheels 38 of the vehicle, and connected in series via a power transmitting member 18 (power transmitting shaft) to the differential portion 11 and the drive wheels 38; and an output rotary member in the form of an output shaft 22 connected to the automatic transmission portion 20. The input shaft 14, differential portion 11, automatic transmission portion 20 and output shaft 22 are coaxially disposed on a common axis in a transmission casing 12 (hereinafter referred to as casing 12) functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device 36 (final speed reduction gear) and a pair of drive axles, as shown in FIG. 5. The engine 8 may be a gasoline engine or diesel engine and functions as a vehicle drive power source directly connected to the input shaft 14 or indirectly via a pulsation absorbing damper.

In the present transmission mechanism 10, the engine 8 and the differential portion 11 are directly connected to each other, as described above. This direct connection means that the engine 8 and the differential portion 11 are connected to each other, without a fluid-operated power transmitting device such as a torque converter or a fluid coupling being disposed therebetween, but may be connected to each other through the pulsation absorbing damper described above. It is noted that a lower half of the transmission mechanism 10, which is constructed symmetrically with respect to its axis, is omitted in FIG. 1. This is also true to the other embodiments of the invention described below.

The differential portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is rotated with the output shaft 22. The second electric motor M2 may be disposed at any portion of the power transmitting path between the power transmitting member 18 and the drive wheels 38. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a first planetary gear set 24 of a single pinion type having a gear ratio $\rho 1$ of about 0.418, for example, a switching clutch C0 and a switching brake B0. The first planetary gear set 24 has rotary elements consisting of: a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio $\rho 1$ is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the casing 12, and the switching clutch C0 is disposed between the first sun gear S1 and the first carrier CA1. When the switching clutch C0 and brake B0 are both released or brought into their released state, the power distributing mechanism 16 is placed in a differential state in which three elements of the first planetary gear set 24 consisting of the first sun gear S1, first carrier CA1 and first ring gear R1 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the differential portion 11 (power distributing mechanism 16) functions as an electrically controlled differential device, and is placed in the continuously-variable shifting state (electrically established CVT state), in which the rotating speed of the power transmitting member 18 is continuously variable, irrespective of the rotating speed of the engine 8, namely, placed in the differential state in which a speed ratio $\gamma 0$ (rotating speed of the input shaft 14/rotating speed of the power transmitting member 18) of the power distributing mechanism 16 is continuously changed from a minimum value $\gamma 0$min to a maximum value $\gamma 0$max, that is, in the continuously-variable shifting state in which the power distributing mechanism 16 functions as an electrically controlled continuously variable transmission the speed ratio $\gamma 0$ of which is continuously variable from the minimum value $\gamma 0$min to the maximum value $\gamma 0$max.

When the switching clutch C0 or brake B0 is engaged or brought into its engaged state while the power distributing mechanism 16 is placed in the continuously-variable shifting state, the power distributing mechanism 16 is brought into a non-differential state in which the power distributing mechanism 16 does not perform the differential function. Described in detail, when the switching clutch C0 is engaged, the first sun gear S1 and the first carrier CA1 are connected together, so that the power distributing mechanism 16 is placed in a locked state in which the three rotary elements of the first planetary gear set 24 consisting of the first sun gear S1, first carrier CA1 and first ring gear R1 are rotatable as a unit, namely, placed in the non-differential state in which the differential function is not available, so that the differential portion 11 is also placed in a non-differential state. In this non-differential state, the rotating speed of the engine 8 and the rotating speed of the power transmitting member 18 are made equal to each other, so that the differential portion 11 (power distributing mechanism 16) is placed in a fixed-speed-ratio shifting state or step-variable shifting state in which the mechanism 16 functions as a transmission having a fixed speed ratio $\gamma 0$ equal to 1.

When the switching brake B0 is engaged in place of the switching clutch C0, the first sun gear S1 is fixed to the casing 12, so that the power distributing mechanism 16 is placed in the locked state in which the first sun gear S1 is not rotatable, namely, placed in the non-differential state in which the differential function is not available, so that the differential portion 11 is also placed in the non-differential state. Since the rotating speed of the first ring gear R1 is made higher than that of the first carrier CA1, the differential portion 11 is placed in the fixed-speed-ratio shifting state or step-variable shifting state in which differential portion 11 (the power distributing mechanism 16) functions as a speed-increasing transmission having a fixed speed ratio $\gamma 0$ smaller than 1, for example, about 0.7.

Thus, the frictional coupling devices in the form of the switching clutch C0 and brake B0 function as a differential-state switching device operable to selectively switch the differential portion 11 (power distributing mechanism 16) between the differential state or non-locked state (non-connected state) and the non-differential state or locked state (connected state), that is, between the differential state in which the differential portion 11 (power distributing mechanism 16) is operable as an electrically controlled differential device, for example, the continuously-variable shifting state in which the differential portion 11 is operable as an electrically controlled continuously variable transmission the speed ratio of which is continuously variable, and the non-differential state in which the differential portion is not electrically controlled to perform a continuously variable shifting action, for example, the locked state in which the differential portion 11 is not operable as the electrically controlled continuously variable transmission and in which the speed ratio of the differential portion 11 is held fixed, namely, the fixed-speed-ratio shifting state in which the differential portion 11 is operable as a transmission having a single gear position with one speed ratio or a plurality of gear positions with respective speed ratios, namely, the fixed-speed-ratio shifting state in which the differential portion 11 is operated as a transmission having a single gear position with one speed ratio or a plurality of gear positions with respective speed ratios.

Considered from another point of view, the switching clutch C0 and switching brake B0 function as a differential limiting device operable to limit the differential function of the power distributing mechanism 16 for limiting the electric differential function of the differential portion 11, namely, the function of the differential portion 11 as the electrically controlled continuously variable transmission, by placing the power distributing mechanism 16 in its non-differential state to place the differential portion 11 in its step-variable shifting state. The switching clutch C0 and switching brake B0 are also operable to place the power distributing mechanism 16 in its differential state, for placing the differential portion 11 in its continuously-variable shifting state, in which the differential function of the power distributing mechanism 16 and the electric differential function of the differential portion 11 are not limited, namely, the function of the differential portion as the electrically controlled continuously variable transmission is not limited.

The automatic transmission portion 20 includes a single-pinion type second planetary gear set 26, a single-pinion type third planetary gear set 28 and a single-pinion type fourth planetary gear set 30, and functions as a step-variable automatic transmission. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio $\rho 2$ of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio $\rho 3$ of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio $\rho 4$ of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios $\rho 2$, $\rho 3$ and $\rho 4$ are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The second carrier CA2 is selectively fixed to the casing 12 through a second brake B2, and the fourth ring gear R4 is selectively fixed to the casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1. Thus, the automatic transmission portion 20 and the differential portion 11 (power transmitting member 18) are selectively connected to each other through the first clutch C1 or the second clutch C2, which is provided to shift the automatic transmission portion 20. Considered from another point of view, the first clutch C1 and the second clutch C2 function as a coupling device operable to place a power transmitting path between the differential portion 11 and the automatic transmission portion 20, in other words, between the differential portion 11 and the drive wheels 38, selectively in one of a power transmitting state in which a vehicle drive force can be transmitted through the power transmitting path, and a power cut-off state in which the vehicle drive force cannot be transmitted through the power transmitting path. Described more specifically, the above-indicated power transmitting path is placed in the power transmitting state when at least one of the first clutch C1 and the second clutch C2 is placed in the engaged state, and is placed in the power cut-off state when the first clutch C1 and the second clutch C2 are placed in the released state.

The above-described switching clutch C0, first clutch C1, second clutch C2, switching brake B0, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 10 constructed as described above, the power distributing mechanism 16 is provided with the switching clutch C0 and the switching brake B0 one of which is engaged to place the differential portion 11 in the continuously-variable shifting state in which the differential portion 11 is operable as a continuously variable transmission, or in the non-continuously-variable shifting state (fixed-speed ratio shifting state) in which the differential portion 11 is operable as a step-variable transmission having a fixed speed ratio or ratios. In the present transmission mechanism 10, therefore, the differential portion 11 placed in the fixed-speed-ratio shifting state by the engaging action of one of the switching clutch C0 and switching brake B0 cooperates with the automatic transmission portion 20 to constitute a step-variable transmission device, while the differential portion 11 placed in the continuously-variable shifting state with the switching clutch C0 and switching brake B0 being both held in the released state cooperates with the automatic transmission portion 20 to constitute an electrically controlled continuously variable transmission device. In other words, the transmission mechanism 10 is placed in its step-variable shifting state by engaging one of the switching clutch C0 and switching brake B0, and in its continuously-variable shifting state by releasing both of the switching clutch C0 and switching brake B0. Similarly, the differential portion 11 is selectively placed in one of its step-variable and continuously-variable shifting states.

Described in detail, when the transmission mechanism 10 functions as the step-variable transmission with its differential portion 11 placed in the non-continuously-variable shifting state, the transmission mechanism 10 is selectively placed in one of first-gear (first-speed) through fifth-gear (fifth-speed) positions, a reverse gear position (reverse drive position) and a neutral position, by engaging one of the switching clutch C0 and switching brake B0, and by selectively engaging the first clutch C1, second clutch C2, first brake B1, second brake B2 and third brake B3, that is, by selecting selectively releasing and engaging the coupling devices provided for shifting the automatic transmission portion 20, for example, by releasing one hydraulically operated frictional coupling device (hereinafter referred to as "releasing-side coupling device") and engaging another hydraulically operated frictional coupling device (hereinafter referred to as "engaging-side coupling device"), so that the speed ratio of the transmission mechanism 10 is automatically changed. An overall speed ratio γT (=input shaft speed $N_{14}$/output shaft speed $N_{OUT}$) of the transmission mechanism 10 changes substantially as geometric series, depending upon the selected gear position. The overall speed ratio γT of the transmission mechanism 10 is a total speed ratio of the transmission mechanism 10 as a whole which is defined by a speed ratio γ0 of the differential portion 11 and a speed ratio γ of the automatic transmission portion 20.

Where the transmission mechanism 10 functions as the step-variable transmission, for example, the first gear position having the highest speed ratio γ1 of about 3.357, for example, is established by engaging actions of the switching clutch C0, first clutch C1 and third brake B3, and the second gear position having the speed ratio γ2 of about 2.180, for example, which is lower than the speed ratio γ1, is established by engaging actions of the switching clutch C0, first clutch C1 and second brake B2, as indicated in FIG. 2. Further, the third gear position having the speed ratio γ3 of about 1.424, for example, which is lower than the speed ratio γ2, is established by engaging actions of the switching clutch C0, first clutch C1 and first brake B1, and the fourth gear position having the speed ratio γ4 of about 1.000, for example, which is lower than the speed ratio γ3, is established by engaging actions of the switching clutch C0, first clutch C1 and second clutch C2. The fifth gear position having the speed ratio γ5 of about 0.705, for example, which is smaller than the speed ratio γ4, is established by engaging actions of the first clutch C1, second clutch C2 and switching brake B0. Further, the reverse gear position having the speed ratio γR of about 3.209, for example, which is intermediate between the speed ratios γ1 and γ2, is established by engaging actions of the second clutch C2 and the third brake B3. It is noted that the reverse gear position is usually established while the differential portion 11 is placed in the continuously-variable shifting state. The neutral position N is established by engaging only the switching clutch C0.

When the transmission mechanism 10 functions as the continuously variable transmission with the differential portion 11 placed in the continuously-variable shifting state, the switching clutch C0 and switching brake B0 are both released to enable the differential portion 11 to function as a continuously variable transmission, while the automatic transmission portion 20 connected in series to the differential portion 11 functions as a step-variable transmission, so that the speed of the rotary motion input to automatic transmission portion 20 (herein after referred to as input speed $N_{IN}$ of the automatic transmission portion 20"), that is, the transmitting-member speed $N_{18}$ is changed continuously for at least one gear position M of the automatic transmission portion 20, whereby the overall speed ratio γT of the transmission mechanism 10 is changed continuously over a predetermined range for each gear position M.

Where the transmission mechanism 10 functions as the continuously-variable transmission, for example, the switching clutch C0 and the switching brake B0 indicated in FIG. 2 are both released, so that the input speed $N_{IN}$ of the automatic transmission portion 20 placed in a selected one of the first, second, third and fourth gear positions (and fifth gear position established by the engaging actions of the same coupling devices as used to establish the fourth gear position) is continuously changed, so that the speed ratio of the drive system when the automatic transmission portion 20 is placed in the selected gear position is continuously variable over a predetermined range. Accordingly, the overall speed ration γT of the transmission mechanism 10 is continuously variable.

Figure 3:
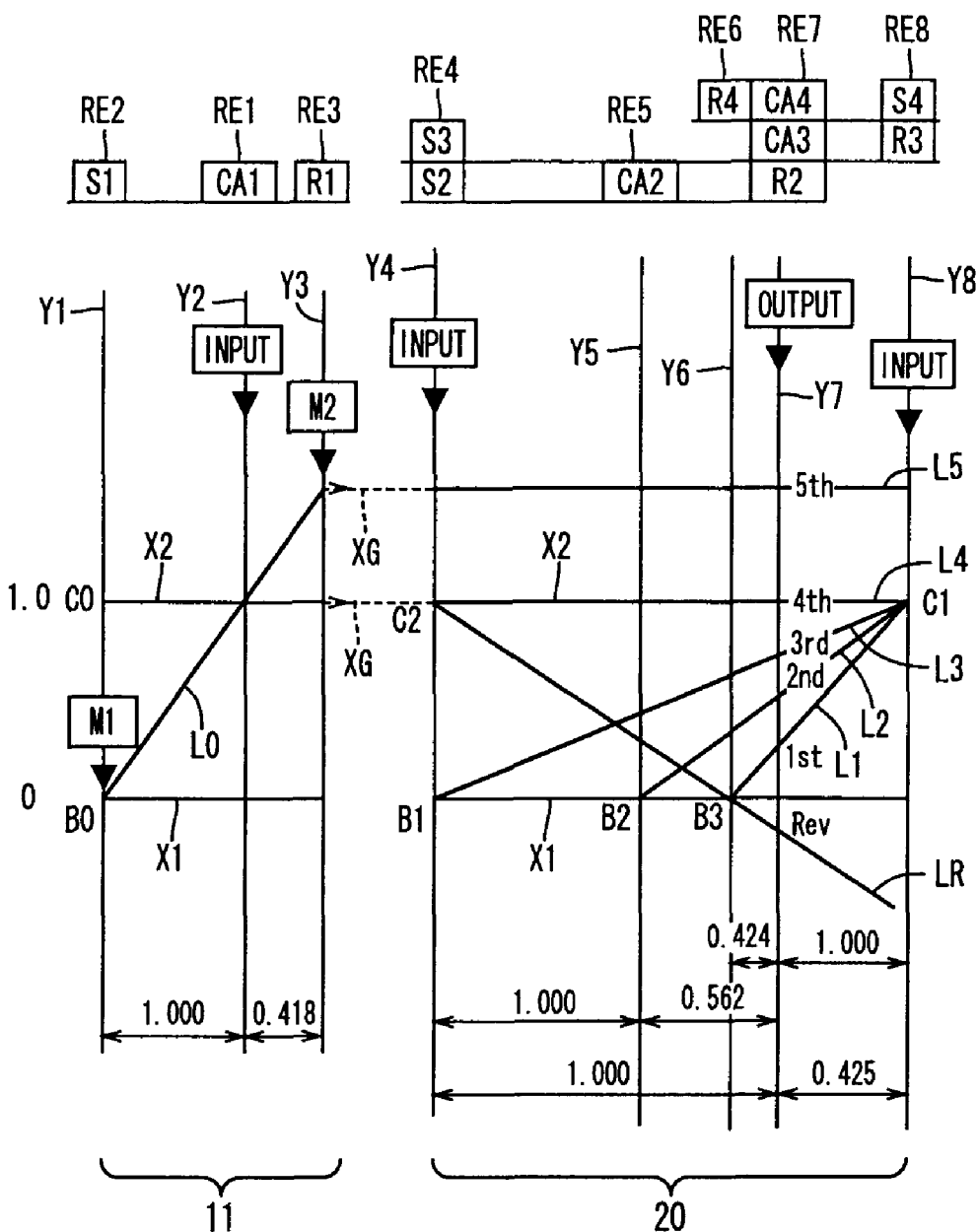
FIG. 3 is a collinear chart indicating relative rotating speeds of the hybrid vehicle drive system of FIG. 1 operated in the step-variable shifting state, in different gear positions of the drive system.

The collinear chart of FIG. 3 indicates, by straight lines, a relationship among the rotating speeds of the rotary elements in each of the gear positions of the transmission mechanism 10, which is constituted by the differential portion 11 functioning as the continuously-variable shifting portion or first shifting portion, and the automatic transmission portion 20 functioning as the transmission portion (step-variable shifting portion) or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8) and selectively connected to the second rotary element RE2 (first sun gear S1) through the switching clutch C0, and this second rotary element RE2 is fixed to the first electric motor M1 and selectively fixed to the casing 12 through the switching brake B0, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

When the transmission mechanism 10 is brought into the continuously-variable shifting state or differential state (in which the at least the second rotary element RE2 and third rotary element RE3, for example, are rotatable at respective different speeds) by releasing actions of the switching clutch C0 and brake B0, for instance, the rotating speed of the first sun gear S1 represented by a point of intersection between the straight line L0 and the vertical line Y1 is raised or lowered by controlling the speed of the first electric motor M1, so that the rotating speed of the first carrier CA1 represented by a point of intersection between the straight line L0 and the vertical line Y2, that is, the engine speed $N_E$ is raised or lowered if the rotating speed of the first ring gear R1 which is determined by the vehicle speed V and which is represented by a point of intersection between the straight line L0 and the vertical line Y3 is held substantially constant.

When the switching clutch C0 is engaged, the first sun gear S1 and the first carrier CA1 are connected to each other, and the power distributing mechanism 16 is placed in the non-differential state in which the above-indicated three rotary elements RE1, RE2, RE3 are rotated as a unit, that is, at least the second rotary element RE2 and third rotary element RE3 are not rotatable at the respective different speeds, so that the straight line L0 is aligned with the horizontal line X2, whereby the power transmitting member 18 is rotated at a speed equal to the engine speed $N_E$. When the switching brake B0 is engaged, on the other hand, the first sun gear S1 is fixed to the casing 12, and the rotary motion of the second rotary element RE2 is stopped, so that the power distributing mechanism 16 is placed in the non-differential state in which at least the second rotary element RE2 and third rotary element RE3 are not rotatable at the respective different speeds, whereby the straight line L0 is inclined as indicated in FIG. 3, and the differential portion 11 functions as the speed increasing mechanism, so that the rotating speed of the first ring gear R1 represented by a point of intersection between the straight lines L0 and Y3, that is, the transmitting-member speed $N_{18}$ is made higher than the engine speed $N_E$ and transmitted to the automatic transmission portion 20.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

When the first clutch C1 and the third brake B3 are engaged, the automatic transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed $N_E$, with the drive force received from the differential portion 11, that is, from the power distributing mechanism 16. When the switching brake B0 is engaged in place of the switching clutch C0, the eighth rotary element RE8 is rotated at a speed higher than the engine speed $N_E$, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
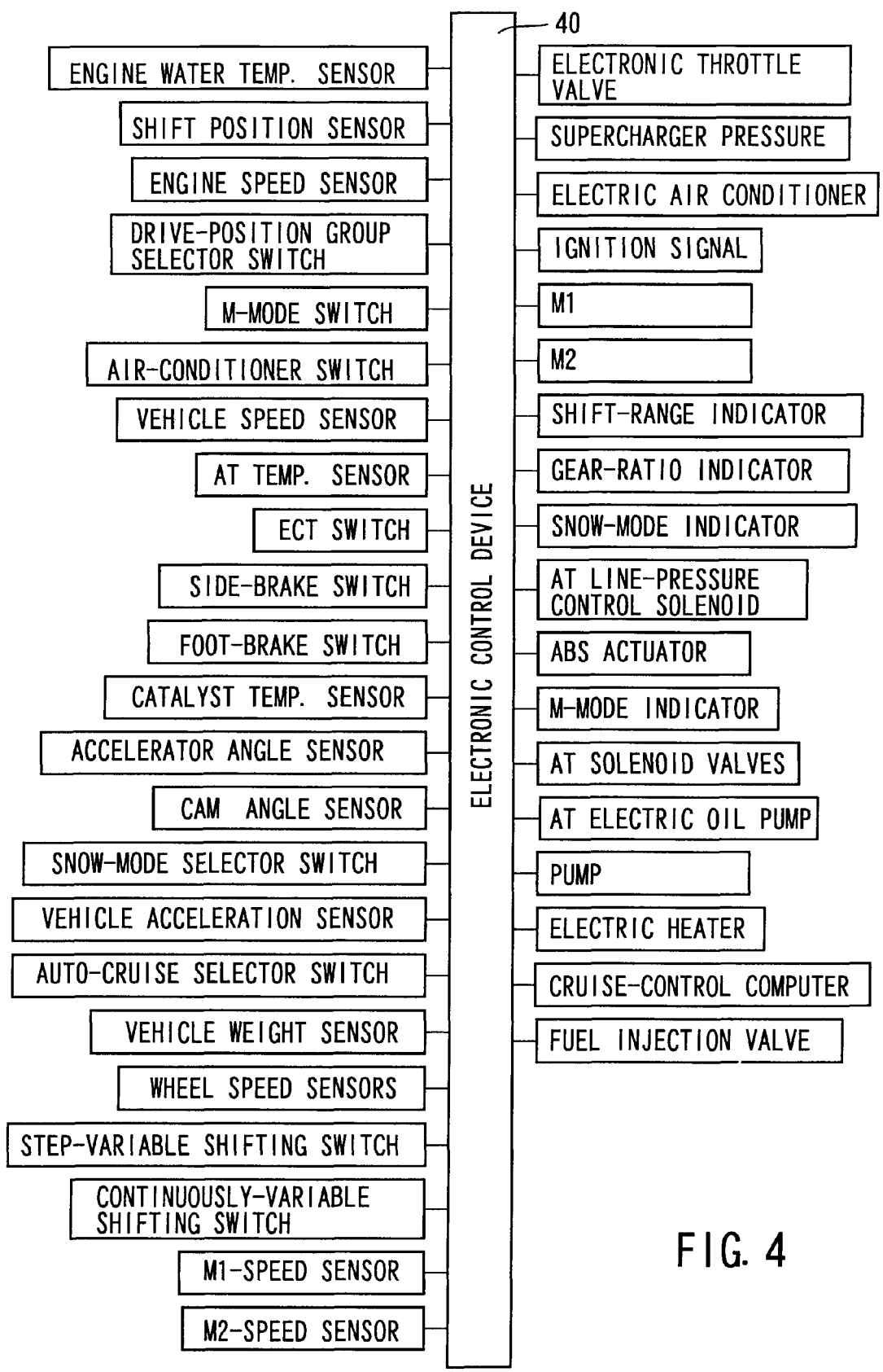
FIG. 4 is a view indicating input and output signals of an electronic control device of the drive system of FIG. 1.

FIG. 4 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the RAM, to implement hybrid drive controls of the engine 8 and electric motors M1 and M2, and drive controls such as shifting controls of the transmission portion 20.

The electronic control device 40 is arranged to receive various sensors and switches shown in FIG. 4, various signals such as: a signal indicative of a temperature $TEMP_W$ of a cooling water of the engine 8; a signal indicative of a selected operating position $P_{SH}$ of a shift lever; a signal indicative of the operating speed $N_E$ of the engine 8; a signal indicative of a value indicating a selected group of forward-drive positions of the transmission mechanism 10; a signal indicative of an M mode (motor drive mode); a signal indicative of an operated state of an air conditioner; a signal indicative of a vehicle speed V corresponding to the rotating speed $N_{OUT}$ of the output shaft 22; a signal indicative of a temperature $T_{OIL}$ of a working oil of the automatic transmission portion 20; a signal indicative of an operated state of a side brake; a signal indicative of an operated state of a foot brake; a signal indicative of a temperature of a catalyst; a signal indicative of an amount of operation (an angle of operation) $A_{CC}$ of an accelerator pedal; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the differential portion 11 (power distributing mechanism 16) in the step-variable shifting state (locked state) in which the transmission mechanism 10 functions as a step-variable transmission; a signal indicative of a continuously-variable shifting switch provided to place the differential portion 11 in the continuously variable-shifting state (differential state) in which the transmission mechanism 10 functions as the continuously variable transmission; a signal indicative of a rotating speed $N_{M1}$ of the first electric motor M1 (hereinafter referred to as "first electric motor speed $N_{M1}$"); a signal indicative of a rotating speed $N_{M2}$ of the second electric motor M2 (hereinafter referred to as "second electric motor speed $N_{M2}$"); a signal indicative of an amount of charging (charged state) SOC of the electric-energy storage device 60; a signal indicative of a coil temperature $TEMP_{M1}$ of the first electric motor M1 (hereinafter referred to as "first-electric-motor temperature $TEMP_{M1}$"); a signal indicative of a coil temperature $TEMP_{M2}$ of the second electric motor M2 (hereinafter referred to as "second-electric-motor temperature $TEMP_{M2}$"); and a signal indicative of a temperature $TEMP_{HV}$ of a cooling water within a hybrid cooling device 62 (shown in FIG. 5), which is used as a cooling fluid for the first electric motor M1 and second electric motor M2.

The electronic control device 40 is further arranged to generate various signals such as: control signals to be applied to an engine output control device 43 (shown in FIG. 5) to control the output of the engine 8, such as a drive signal to drive a throttle actuator 97 for controlling an angle of opening $\theta_{TH}$ of an electronic throttle valve 96 disposed in a suction pipe 95 of the engine 8, a signal to control an amount of injection of a fuel by a fuel injecting device 98 into the suction pipe 95 or cylinders of the engine 8, a signal to be applied to an ignition device 99 to control the ignition timing of the engine 8, and a signal to adjust a supercharger pressure of the engine 8; a signal to operate the electric air conditioner; signals to operate the electric motors M1 and M2; a signal to operate a shift-range indicator for indicating the selected operating or shift position of the shift lever 48; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 (shown in FIG. 5) provided to control the hydraulic actuators of the hydraulically operated frictional coupling devices of the differential portion 11 and automatic transmission portion 20; a signal to operate an electric oil pump used as a hydraulic pressure source for the hydraulic control unit 42; a signal to drive an electric heater; and a signal to be applied to a cruise-control computer.

FIG. 5 is a functional block diagram for explaining major control functions of the electronic control device 40. A step-variable shifting control means 54 shown in FIG. 5 is arranged to determine whether a shifting action of the transmission mechanism 10 should take place or not, for example, to determine the gear position to which the automatic transmission portion 20 should be shifted. This determination is made on the basis of a condition of the vehicle in the form of the vehicle speed V and an output torque $T_{OUT}$ of the automatic transmission portion 20, and according to a shifting boundary line map (shifting control map or relation) which is stored in memory means 56 and which represents shift-up boundary lines indicated by solid lines in FIG. 6 and shift-down boundary lines indicated by one-dot chain lines in FIG. 6. The step-variable shifting control means 54 controls the automatic transmission portion 20 so as to be shifted to the determined gear position. That is, the step-variable shifting control means 54 generates a command (hydraulic shifting command) to be applied to the hydraulic control unit 42, to selectively engage and release the respective two hydraulically operated frictional coupling devices, for establishing the determined gear position of the automatic transmission portion 20 according to the table of FIG. 2, namely, a command to effect a clutch-to-clutch shifting action of the automatic transmission portion 20 by a releasing action of the releasing-side coupling device and an engaging action of the engaging-side coupling device. According to this command, the hydraulic control unit 42 activates solenoid-operated valves incorporates therein, to drive hydraulic actuators of the hydraulically operated frictional coupling devices, for thereby releasing the releasing-side coupling device and engaging the engaging-side coupling device, for shifting the automatic transmission 20.

A hybrid control means 52 functions as continuously-variable shifting control means and is arranged to control the engine 8 to be operated in an operating range of high efficiency, and control the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the differential portion 11 operating as the electrically controlled continuously variable transmission, while the transmission mechanism 10 is placed in the continuously-variable shifting state, that is, while the differential portion 11 is placed in the differential state. For instance, the hybrid control means 52 calculates a target (required) vehicle output at the present running speed V of the vehicle, on the basis of the operating amount $A_{CC}$ of the accelerator pedal used as an operator's required vehicle output and the vehicle running speed V, and calculate a target total vehicle output on the basis of the calculated target vehicle output and a required amount of generation of an electric energy by the first electric motor M1. The hybrid control means 52 calculates a target output of the engine 8 to obtain the calculated target total vehicle output, while taking account of a power transmission loss, a load acting on various devices of the vehicle, an assisting torque generated by the second electric motor M2, etc. The hybrid control means 52 controls the speed $N_E$ and torque $T_E$ of the engine 8, so as to obtain the calculated target engine output, and the amount of generation of the electric energy by the first electric motor M1.

The hybrid control means 52 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electrically controlled continuously-variable transmission, for optimum coordination of the engine speed $N_E$ for efficient operation of the engine 8, and the transmitting-member speed $N_{18}$ determined by the vehicle speed V and the selected gear position of the transmission portion 20. That is, the hybrid control means 52 determines a target value of the overall speed ratio γT of the transmission mechanism 10, so that the engine 8 is operated according to a highest-fuel-economy curve (fuel-economy map or relation not shown) stored in the memory means 56. The target value of the overall speed ratio γT of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control means 52 controls the speed ratio γ0 of the differential portion 11, while taking account of the selected gear position of the automatic transmission portion 20, so as to obtain the target value of the overall speed ratio γT, so that the overall speed ratio γT can be controlled within a predetermined range, for example, between 13 and 0.5.

In the hybrid control, the hybrid control means 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the power transmitting member 18. Thus, the drive system is provided with an electric path through which an electric energy generated by conversion of a portion of a drive force of the engine 8 is converted into a mechanical energy.

The hybrid control means 52 is further arranged to hold the engine speed $N_E$ substantially constant or at a desired value, by controlling the first electric motor speed $N_{M1}$ and/or the second electric motor speed $N_{M2}$ owing to the electric CVT function of the differential portion 11, irrespective of whether the vehicle is stationary or running. In other words, the hybrid control means 52 is capable of controlling the first electric motor speed $N_{M1}$ and/or the second electric motor speed $N_{M2}$ as desired while holding the engine speed $N_E$ substantially constant or at a desired value.

To raise the engine speed $N_E$ during running of the vehicle, for example, the hybrid control means 52 raises the operating speed $N_{M1}$ of the first electric motor M1 while the operating speed $N_{M2}$ of the second electric motor M2 determined by the vehicle speed V (speed of the drive wheels 38) is held substantially constant, as is apparent from the collinear chart of FIG. 3. To hold the engine speed $N_E$ substantially constant during a shifting operation of the automatic transmission portion 20, the hybrid control means 52 changes the first electric motor speed $N_{M1}$ in a direction opposite to the direction of change of the second electric motor speed $N_{M2}$ caused by the shifting operation of the automatic transmission portion 20, while the engine speed $N_E$ is held substantially constant.

The hybrid control means 52 includes engine output control means functioning to control the engine 8, so as to provide a required output, by controlling the throttle actuator 97 to open and close the electronic throttle valve 96, and controlling an amount and time of fuel injection by the fuel injecting device 98 into the engine 8, and/or the timing of ignition of the igniter by the ignition device 99, alone or in combination. For instance, the hybrid control means 52 is basically arranged to control the throttle actuator 97 on the basis of the operating amount $A_{CC}$ of the accelerator pedal and according to a predetermined stored relationship (not shown) between the operating amount $A_{CC}$ and the opening angle $\theta_{TH}$ of the electronic throttle valve 96 such that the opening angle $\theta_{TH}$ increases with an increase of the operating amount $A_{CC}$. The engine output control device 43 controls the throttle actuator 97 to open and close the electronic throttle valve 96, controls the fuel injecting device 98 to control the fuel injection, and controls the ignition device 99 to control the ignition timing of the igniter, for thereby controlling the torque of the engine 8, according to the commands received from the hybrid control means 52.

Figure 6:
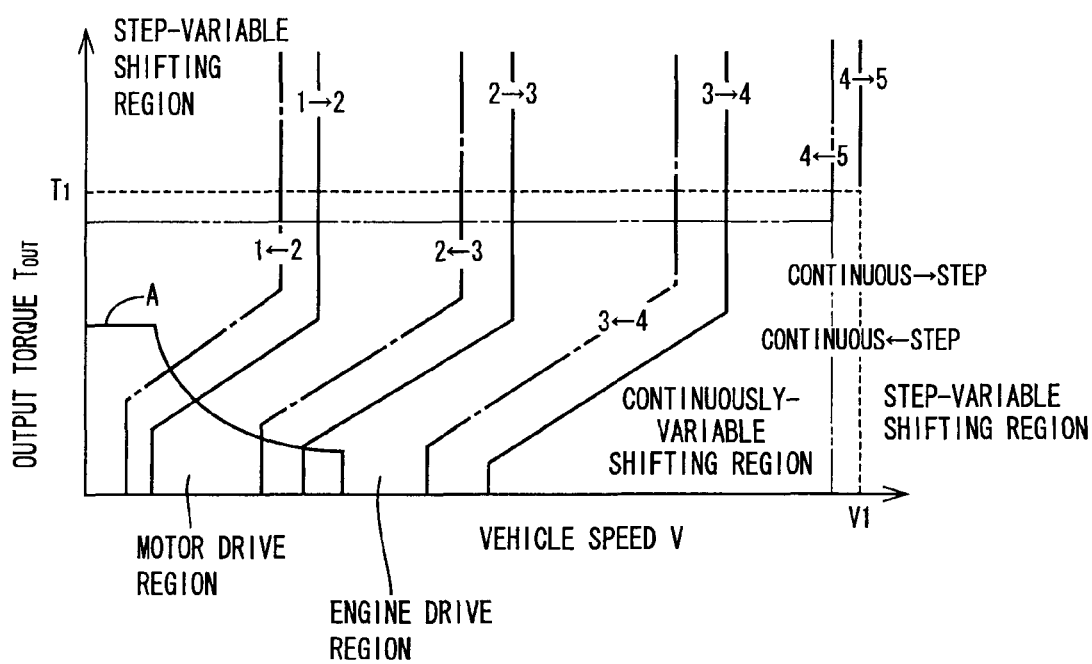
FIG. 6 is a view illustrating an example of a stored shifting boundary line map used for determining a shifting action of an automatic transmission portion, an example of a stored switching boundary line map used for switching the shifting state of a transmission mechanism, and an example of a stored drive-power-source switching boundary line map defining boundary lines between an engine drive region and a motor drive region for switching between an engine drive mode and a motor drive mode, in the same two-dimensional coordinate system defined by control parameters in the form of a running speed and an output torque of the vehicle, such that those maps are related to each other.

The hybrid control means 52 is capable of establishing a motor-drive mode to drive the vehicle by the electric motor, by utilizing the electric CVT function of the differential portion 11, irrespective of whether the engine 8 is in the non-operated state or in the idling state. Solid line A in FIG. 6 represents an example of a boundary line defining an engine-drive region and a motor-drive region, for switching the vehicle drive power source for starting and driving the vehicle (hereinafter referred to as "drive power source"), between the engine 8 and the electric motor (e.g., second electric motor M2). In other words, the vehicle drive mode is switchable between a so-called "engine drive mode" corresponding to the engine-drive region in which the vehicle is started and driven with the engine 8 used as the drive power source, and the so-called "motor-drive mode" corresponding to the motor-drive region in which the vehicle is driven with the second electric motor M2 used as the drive power source. A predetermined stored relationship representing the boundary line (solid line A) of FIG. 6 for switching between the engine-drive mode and the motor-drive mode is an example of a drive-power-source switching map (drive-power-source map) in a two-dimensional coordinate system defined by control parameters in the form of the vehicle speed V and a drive-force-related value in the form of the output torque $T_{OUT}$. This drive-power-source switching map is stored in the memory means 56, together with the shifting boundary line map (shifting map) indicated by solid lines and one-dot chain lines in FIG. 6.

The hybrid control means 52 determines whether the vehicle condition is in the motor-drive region or engine-drive region, and establishes the motor-drive mode or engine-drive mode. This determination is made on the basis of the vehicle condition represented by the vehicle speed V and the required output torque $T_{OUT}$, and according to the drive-power-source switching map of FIG. 6. As is understood from FIG. 6, the motor-drive mode is generally established by the hybrid control means 52, when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low. Usually, therefore, the vehicle is started in the motor-drive mode, rather than in the engine-drive mode. When the vehicle condition upon starting of the vehicle is outside the motor-drive region defined by the drive-power-source switching map of FIG. 6, as a result of an increase of the required output torque Tour or engine torque $T_E$ due to an operation of the accelerator pedal, the vehicle may be started in the engine-drive mode.

For reducing a dragging of the engine 8 in its non-operated state and improving the fuel economy in the motor-drive mode, the hybrid control means 52 is arranged to hold the engine speed $N_E$ at zero or substantially zero as needed, owing to the electric CVT function (differential function) of the differential portion 11, that is, by controlling the differential portion 11 to perform its electric CVT function (differential function), so that the first electric motor speed 1 is controlled so as to be freely rotated to have a negative speed $N_{M1}$.

The hybrid control means 52 is further capable of performing a so-called "torque assist" operation to assist the engine 8, by supplying an electric energy from the first electric motor M1 or the electric-energy storage device 60 to the second electric motor M2, so that the second electric motor M2 is operated to transmit a drive torque to the drive wheels 38. Thus, the second electric motor M2 may be used in addition to the engine 8, in the engine-drive mode. The torque assist operation may be performed to increase the output torque of the second electric motor M2 in the motor drive mode.

The hybrid control means 52 is arranged to hold the engine 8 in an operated state owing to the electric CVT function of the differential portion 11, irrespective of whether the vehicle is stationary or running at a relatively low speed. When the first electric motor M1 is required to be operated to charge the electric-energy storage device 60 while the vehicle is stationary, in order to charge the electric-energy storage device 60 where the electric energy amount SOC stored in the storage device 60 is reduced, the speed $N_E$ of the engine 8 which is operated to operate the first electric motor M1 at a relatively high speed can be kept high enough to permit the operation of the engine 8 by itself, owing to the differential function of the power distributing mechanism 16, even while the operating speed of the second electric motor M2 determined by the vehicle speed V is zero (substantially zero) when the vehicle is stationary.

The hybrid control means 52 is further arranged to place the first electric motor M1 in a non-load state by cutting off an electric current applied from the electric energy storage device 60 to the first electric motor M1 through the inverter 58. When the first electric motor M1 is placed in the non-load state, the first electric motor M1 is permitted to be freely rotated, and the differential portion is placed in a state similar to the power cut-off state in which power cannot be transmitted through the power transmitting path within the differential portion 11, and no output can be generated from the differential portion 11. Namely, the hybrid control means 52 is functions as electric-motor control means for placing the first electric motor M1 in the non-load state, for thereby placing the differential portion 11 in a neutral state in which the power transmitting path is electrically cut off.

High-speed-gear determining means 57 is provided to determine whether the gear position to which the transmission mechanism 10 should be shifted or not on the basis of the vehicle condition and according to the shifting boundary line map stored in the memory means 56 and indicated in FIG. 6 by way of example is a high-speed-gear position, for example, the fifth gear position. This determination is made by determining whether the gear position selected by the step-variable shifting control means 54 is the fifth gear position or not, for determining which one of the switching clutch C0 and brake B0 should be engaged to place the transmission mechanism 10 in the step-variable shifting state.

Switching control means 50 is arranged to selectively switch the transmission mechanism 10 by selectively engaging and releasing the coupling devices (switching clutch C0 and switching brake B0), between the continuously-variable shifting state and the step-variable shifting state, that is, between the differential state and the locked state, on the basis of the vehicle condition. For example, the switching control means 50 is arranged to determine whether the shifting state of the transmission mechanism 10 should be changed or not, on the basis of the vehicle condition represented by the vehicle speed V and the required output torque $T_{OUT}$ and according to the switching boundary line map (switching control map or relation) stored in the memory means 56 and indicated by broken line and two-dot chain line in FIG. 6 by way of example, namely, whether the vehicle condition is in the continuously-variable shifting region for placing the transmission mechanism 10 in the continuously-variable shifting state, or in the step-variable shifting region for placing the transmission mechanism 10 in the step-variable shifting state. The switching control means 50 places the transmission mechanism 10 in the continuously-variable shifting state or step-variable shifting state, depending upon whether the vehicle condition is in the continuously-variable shifting region or in the step-variable shifting region. Thus, the switching control means 50 functions as differential-state limiting means for limiting the operation the operation of the differential portion 11 as the electrically controlled differential device, namely, for limiting the operation of the differential portion 11 as the electrically controlled continuously variable transmission, by placing the differential portion 11 in the non-continuously-variable shifting state by selectively engaging and releasing the switching clutch C0 or switching brake B0.

Described in detail, when the switching control means 50 determines that the vehicle condition is in the step-variable shifting region, the switching control means 50 disables the hybrid control means 52 to implement a hybrid control or continuously-variable shifting control, and enables the step-variable shifting control means 54 to implement a predetermined step-variable shifting control in which the transmission portion 20 is automatically shifted according to the shifting boundary line map stored in the memory means 56 and indicated in FIG. 6 by way of example. FIG. 2 indicates the combinations of the engaging actions of the hydraulically operated frictional coupling devices C0, C1, C2, B0, B1, B2 and B3, which are stored in the memory means 56 and which are selectively used for automatic shifting of the automatic transmission portion 20. In the step-variable shifting state, the transmission mechanism 10 as a whole constituted by the differential portion 11 and the automatic transmission portion 20 functions as a so-called step-variable automatic transmission which is automatically shifted according to the table of FIG. 2.

When the high-speed-gear determining means 57 has determined that the transmission mechanism 10 should be shifted to the fifth gear position, the switching control means 50 commands the hydraulic control unit 42 to release the switching clutch C0 and engage the switching brake B0, for enabling the differential portion 11 to function as an auxiliary transmission having a fixed speed ratio γ0 of 0.7, for example, so that the transmission mechanism 10 as a whole is placed in a high-speed gear position so-called "an overdrive gear position" having a speed ratio lower than 1.0. When the high-speed-gear determining means 57 has not determined that the transmission mechanism 10 should be shifted to the fifth gear position, the switching control means 50 commands the hydraulic control unit 42 to engage the switching clutch C0 and release the switching brake B0, for enabling the differential portion 11 to function as an auxiliary transmission having a fixed speed ratio γ0 of 1.0, for example, so that the transmission mechanism 10 as a whole is placed in a speed-reducing gear position having a speed ratio not lower than 1.0. Thus, when the transmission mechanism 10 is switched to the step-variable shifting state by the switching control means 50, the differential portion 11 operable as the auxiliary transmission is placed in a selected one of two gear positions under the control of the switching control means 50 while the automatic transmission portion 20 connected in series to the differential portion 11 functions as a step-variable transmission, so that the transmission mechanism 10 as a whole functions as the so-called step-variable automatic transmission.

When the switching control means 50 has determined that the vehicle condition is in the continuously-variable shifting region for placing the transmission mechanism 10 in the continuously-variable shifting state, the switching control means 50 commands the hydraulic control unit 42 to release both of the switching clutch C0 and brake B0, for placing the differential portion 11 in the continuously-variable shifting state. At the same time, the switching control means 50 enables the hybrid control means 52 to implement the hybrid control, and commands the step-variable shifting control means 54 to select and hold a predetermined one of the gear positions, or to permit the automatic transmission portion 20 to be automatically shifted according to the shifting boundary line map stored in the memory means 56 and indicated in FIG. 6 by way of example. In the latter case, the variable-step shifting control means 54 implements the automatic shifting control by suitably selecting the combinations of the operating states of the frictional coupling devices indicated in the table of FIG. 2, except the combinations including the engagement of the switching clutch C0 and brake B0. Thus, the differential portion 11 switched to the continuously-variable shifting state under the control of the switching control means 50 functions as the continuously variable transmission while the automatic transmission portion 20 connected in series to the differential portion 11 functions as the step-variable transmission, so that the transmission mechanism 10 provides a sufficient vehicle drive force, such that the input speed $N_{IN}$ of the automatic transmission portion 20 placed in one of the first through fourth gear positions, namely, the rotating speed $N_{18}$ of the power transmitting member 18 is continuously changed, so that the speed ratio of the transmission mechanism 10 when the transmission portion 20 is placed in one of those gear positions is continuously variable over a predetermined range. Accordingly, the speed ratio of the automatic transmission portion 20 is continuously variable across the adjacent gear positions, whereby the total speed ratio $\gamma T$ of the transmission mechanism 10 is continuously variable.

The maps of FIG. 6 will be described in detail. The shifting boundary line map (shifting control map or relation) shown in FIG. 6 by way of example and stored in the memory means 56 is used for determining whether the automatic transmission portion 20 should be shifted or not, and is defined in a two-dimensional coordinate system by control parameters consisting of the vehicle speed V and the drive-force-related value in the form of the required output torque $T_{OUT}$. In FIG. 6, the solid lines indicate the shift-up boundary lines, while the one-dot chain lines indicate the shift-down boundary lines.

The broken lines in FIG. 6 represent the upper vehicle-speed limit V1 and the upper output-torque limit T1 which are used for the switching control means 50 to determine whether the vehicle condition is in the step-variable shifting region or the continuously-variable shifting region. In other words, the broken lines represent a high-speed-running boundary line indicative of the upper vehicle-speed limit V1 above which it is determined that the hybrid vehicle is in a high-speed running state, and a high-output-running boundary line indicative of the upper output-torque limit T1 of the output torque $T_{OUT}$ of the automatic transmission portion 20 above which it is determined that the hybrid vehicle is in a high-output running state. The output torque $T_{OUT}$ is an example of the drive-force-related value which relates to the drive force of the hybrid vehicle. FIG. 6 also shows two-dot chain lines which are offset with respect to the broken lines, by a suitable amount of control hysteresis for determination as to whether the step-variable shifting state is changed to the continuously-variable shifting state or vice versa. Thus, the broken lines and two-dot chain lines of FIG. 6 constitute the stored switching boundary line map (switching control map or relation) used by the switching control means 50 to determine whether the vehicle condition is in the step-variable shifting region or the continuously-variable shifting region, depending upon whether the control parameters in the form of the vehicle speed V and the output torque $T_{OUT}$ are higher than the predetermined upper limit values V1, T1 or not. This switching boundary line map may be stored in the memory means 56, together with the shifting boundary line map. The switching boundary line map may use at least one of the upper vehicle-speed limit V1 and the upper output-torque limit T1, or at least one of the vehicle speed V and the output torque $T_{OUT}$, as at least one parameter.

The above-described shifting boundary line map, switching boundary line, and drive-power-source switching map may be replaced by stored equations for comparison of the actual vehicle speed V with the limit value V1 and comparison of the actual output torque $T_{OUT}$ with the limit value T1. In this case, the switching control means 50 switches the transmission mechanism 10 in the step-variable shifting state by engaging the switching brake B0, when the actual vehicle speed V has exceeded the upper limit V1, or by engaging the switching clutch C0, when the output torque $T_{OUT}$ of the automatic transmission portion 20 has exceeded the upper limit T1.

The switching control means 50 may be arranged to place the transmission mechanism 10 in the step-variable shifting state even when the vehicle condition is in the continuously-variable shifting region, upon detection of any defect or functional deterioration of the electric components such as the electric motors which are operable to operate the differential portion 11 as the electrically controlled continuously variable transmission. Those electric components include components such as the first electric motor M1, second electric motor M2, inverter 58, electric-energy storage device 60 and electric lines interconnecting those components, which are associated with the electric path through which an electric energy generated by the first electric motor M1 is converted into a mechanical energy. The functional deterioration of the components may be caused by their failure or a drop of their temperatures. For instance, the switching control means 50 is arranged to determine whether any electric components such as the electric motors for enabling the differential portion 11 as the electrically controlled continuously variable transmission have any defect or functional deterioration, and to place the differential mechanism 10 in the step-variable shifting state upon determination of any defect or functional deterioration.

The drive-force-related value indicated above is a parameter corresponding to the drive force of the vehicle, which may be the output torque $T_{OUT}$ of the automatic transmission portion 20, the engine output torque $T_E$ or an acceleration value G of the vehicle, as well as a drive torque or drive force of drive wheels 38. The parameter may be: an actual value calculated on the basis of the operating amount $A_{CC}$ of the accelerator pedal or the opening angle $\theta_{TH}$ of the throttle valve (or intake air quantity, air/fuel ratio or amount of fuel injection) and the engine speed $N_E$; or any one of estimated values of the required (target) engine torque $T_E$, required (target) output torque $T_{OUT}$ of the transmission portion 20 and required vehicle drive force, which are calculated on the basis of the operating amount $A_{CC}$ of the accelerator pedal or the operating angle $\theta_{TH}$ of the throttle valve. The above-described vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the upper vehicle-speed limit V1 is determined so that the transmission mechanism 10 is placed in the step-variable shifting state while the vehicle is in the high-speed running state. That is, during the high-speed running of the vehicle, the differential mechanism 10 is effectively utilized as the step-variable transmission of planetary gear type which has a high power transmitting efficiency not having an electric path.

On the other hand, the upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle. Alternatively, the upper output-torque limit T1 is determined such that the transmission mechanism 10 is placed in the step-variable shifting state in the high-speed running state, that is, functions as a step-variable transmission the speed ratio of which is variable in steps, rather than as a continuously variable transmission. This determination is based on a desire of the vehicle operator to have the engine speed changing as a result of a shifting action of the transmission, which desire is higher than a desire of the vehicle operator to improve the fuel economy, in the high-output running state of the vehicle.

Figure 7:
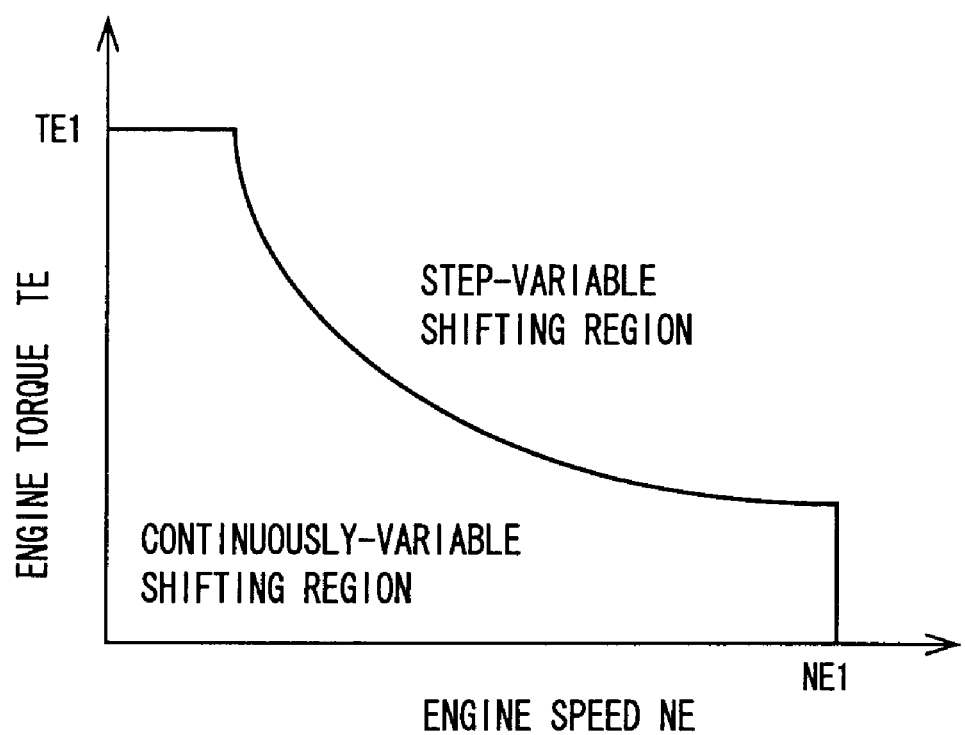
FIG. 7 is a view illustrating a stored relationship defining boundary lines between a continuously-variable shifting region and a step-variable shifting region, which relationship is used to map boundary lines defining the continuously-variable and step-variable shifting regions which are indicated by broken lines in FIG. 6.

Referring to FIG. 7, there is shown a switching boundary line map (switching control map or relation) which is stored in the memory means 56 and which defines engine-output lines serving as boundary lines used by the switching control means 50 to determine whether the vehicle condition is in the step-variable or continuously-variable shifting region or not. These engine-output lines are defined by control parameters in the form of the engine speed $N_E$ and the engine torque $N_T$. The switching control means 50 may use the switching boundary line map of FIG. 7 in place of the switching boundary line map of FIG. 6, to determine whether the vehicle condition is in the continuously-variable or step-variable shifting region, on the basis of the engine speed $N_E$ and engine torque $T_E$. The switching boundary line map of FIG. 6 may be based on the switching boundary line map of FIG. 7. In other words, the broken lines in FIG. 6 may be determined on the basis of the relation (map) of FIG. 7, in the two-dimensional coordinate system defined by the control parameters in the for of the vehicle speed V and the output torque $T_{OUT}$.

The step-variable shifting region defined by the switching boundary line map of FIG. 6 is defined as a high-torque drive region in which the output torque $T_{OUT}$ is not lower than the predetermined upper limit T1, or a high-speed drive region in which the vehicle speed V is not lower than the predetermined upper limit V1. Accordingly, the step-variable shifting control is implemented when the torque of the engine 8 is comparatively high or when the vehicle speed V is comparatively high, while the continuously-variable shifting control is implemented when the torque of the engine 8 is comparatively low or when the vehicle speed V is comparatively low, that is, when the engine 8 is in a normal output state.

Similarly, the step-variable shifting region defined by the switching boundary line map of FIG. 7 is defined as a high-torque drive region in which the engine torque $T_E$ is not lower than the predetermined upper limit TE1, or a high-speed drive region in which the engine speed $N_E$ is not lower than the predetermined upper limit NE1, or alternatively defined as a high-output drive region in which the output of the engine 8 calculated on the basis of the engine torque $N_T$ and speed $N_E$ is not lower than a predetermined limit. Accordingly, the step-variable shifting control is implemented when the torque $T_E$, speed $N_E$ or output of the engine 8 is comparatively high, while the continuously-variable shifting control is implemented when the torque $T_E$, speed $N_E$ or output of the engine 8 is comparatively low, that is, when the engine 8 is in the normal output state. The boundary lines of the switching boundary switching map of FIG. 7 may be considered as high-speed threshold lines or high-engine-output threshold lines, which define upper limit of the vehicle speed V or engine output.

In the present embodiment described above, the transmission mechanism 10 is placed in the continuously-variable shifting state in a low-speed or medium-speed running state of the vehicle or in a low-output or medium-output running state of the vehicle, assuring a high degree of fuel economy of the vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the differential portion 11 functions as the electrically controlled continuously variable transmission.

In a high-output running state of the vehicle with the output torque Tour higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors.

Namely, the upper limit TE1 is determined such that the first electric motor M1 can generate the reaction torque corresponding to the engine torque $T_E$ when the engine output $T_E$ is not higher than the upper limit TE1, and the differential portion 11 is placed in the step-variable shifting state when the vehicle is in the high-output running state in which the engine torque $T_E$ is higher than the upper limit TE1. In the step-variable shifting state of the differential portion 11, the first electric motor M1 need not generate the reaction torque corresponding to the engine torque $T_E$ as in the continuously-variable shifting state of the differential portion 11, making it possible to reduce deterioration of durability of the first electric motor M1 while preventing an increase of its required size. In other words, the required maximum output of the first electric motor M1 in the present embodiment can be made smaller than its reaction torque capacity corresponding to the maximum value of the engine output $T_E$. That is, the required maximum output of the first electric motor M1 can be determined such that its reaction torque capacity is smaller than a value corresponding to the engine torque $T_E$ exceeding the upper limit TE1, so that the required size of the first electric motor M1 can be reduced.

The maximum output of the first electric motor M1 is a nominal rating of this motor which is determined by experimentation in the environment in which the motor is operated. The above-described upper limit of the engine torque $T_E$ is determined by experimentation such that the upper limit is a value which is equal to or lower than the maximum value of the engine torque $T_E$, and below which the first electric motor M1 can withstand the reaction torque, so that the deterioration of durability of the first electric motor M1 can be reduced.

Figure 8:
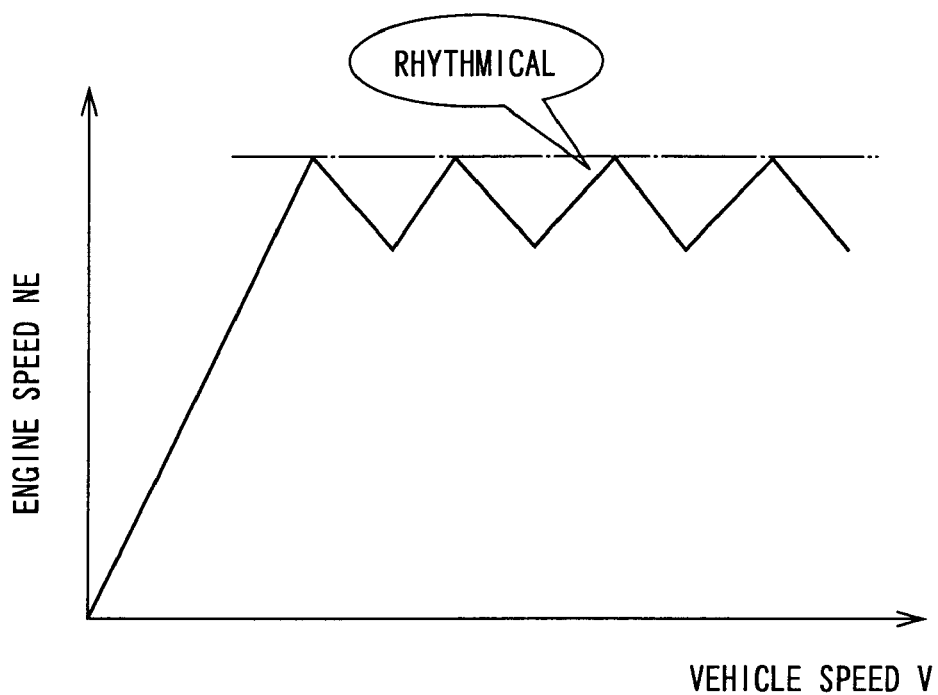
FIG. 8 is a view indicating an example of a change of the engine speed as a result of a shift-up action of the step-variable transmission.

According to the other concept, the transmission mechanism 10 is placed in the step-variable shifting state (fixed-speed-ratio shifting state), rather than in the continuously-variable shifting state, in the high-output running state of the vehicle in which the vehicle operator has a stronger desire for improved drivability of the vehicle rather than improved fuel economy. In this case, the engine speed $N_E$ changes with a shift-up action of the automatic transmission portion 20, assuring a comfortable rhythmic change of the engine speed $N_E$ as the transmission portion 20 is shifted up, as indicated in FIG. 8.

Figure 9:
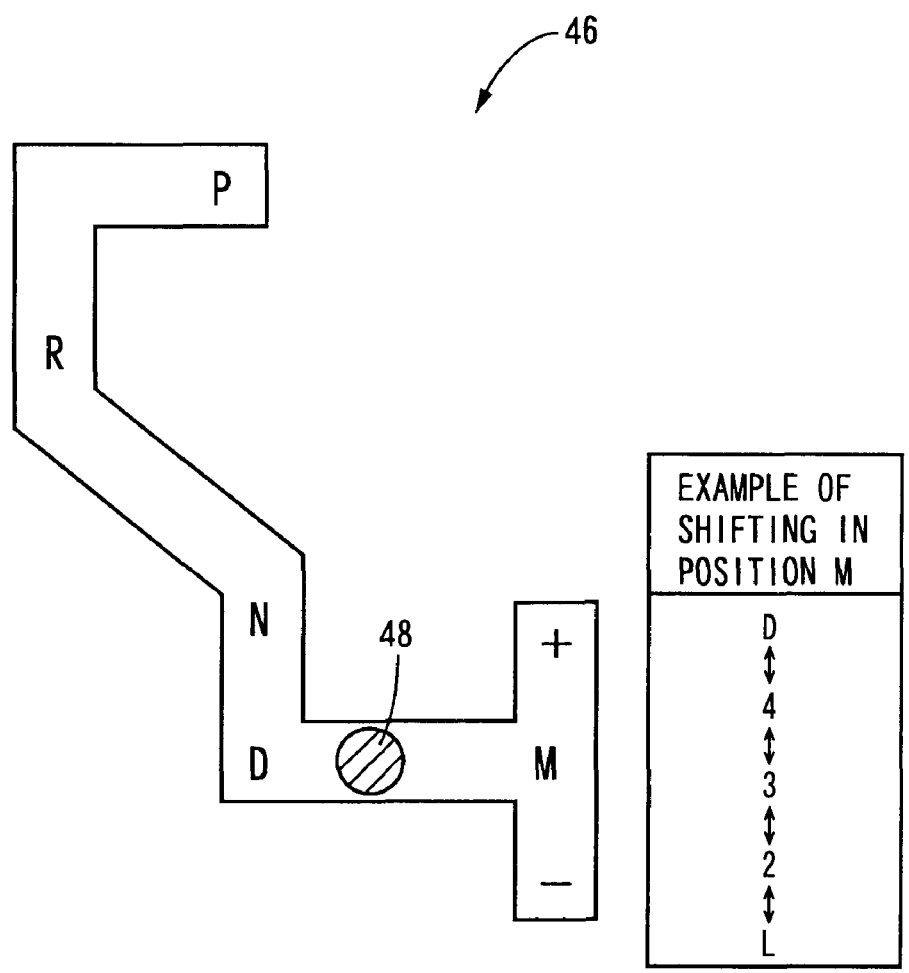
FIG. 9 is a view showing an example of a manually operated shifting device operable to select one of a plurality of shift positions.

FIG. 9 shows an example of a manually operable shifting device in the form of a shifting device 46. The shifting device 46 includes the above-described shift lever 48, which is disposed laterally adjacent to an operator's seat, for example, and which is manually operated to select one of a plurality of positions consisting of a parking position P for placing the drive system 10 (namely, automatic transmission portion 20) in a neutral state in which a power transmitting path is disconnected with both of the first clutch C1 and second clutch C2 placed in the released state, and at the same time the output shaft 22 of the automatic transmission portion 20 is in the locked state; a reverse-drive position R for driving the vehicle in the rearward direction; a neutral position N for placing the drive system 10 in the neutral state; an automatic forward-drive shifting position D; and a manual forward-drive shifting position M.

When the shift lever 48 is operated to a selected one of the shift positions, a manual valve incorporated in the hydraulic control unit 42 and operatively connected to the shift lever 48 is operated to establish the corresponding state of the hydraulic control unit 42. In the automatic forward-drive position D or the manual forward-drive position M, one of the first through fifth gear positions ($1^{st}$ through $5^{th}$) indicated in the table of FIG. 2 is established by electrically controlling the appropriate solenoid-operated valves incorporated in the hydraulic control unit 42.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power-cut-off state established by releasing both of the first and second clutches C1 and C2, as shown in the table of FIG. 2. In the drive positions R, D, M, the power transmitting path in the automatic transmission portion 20 is in the power-transmitting state established by engaging at least one of the clutches C1 and C2, as also shown in the table of FIG. 2.

Described in detail, a manual operation of the shift lever 48 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 48 from the neutral position N to the automatic forward-drive position D causes at least the first clutch C1 to be engaged for switching the power transmitting path in the automatic transmission portion 20 from the power-cut-off state to the power-transmitting state. The automatic forward-drive position D provides a highest-speed position, and positions "4$^{38}$ through "L" selectable in the manual forward-drive position M are engine-braking positions in which an engine brake is applied to the vehicle.

The manual forward-drive position M is located at the same position as the automatic forward-drive position D in the longitudinal direction of the vehicle, and is spaced from or adjacent to the automatic forward-drive position D in the lateral direction of the vehicle. The shift lever 48 is operated to the manual forward-drive position M, for manually selecting one of the above-indicated positions "D" through "L". Described in detail, the shift lever 48 is movable from the manual forward-drive position M to a shift-up position "+" and a shift-down position "−", which are spaced from each other in the longitudinal direction of the vehicle. Each time the shift lever 48 is moved to the shift-up position "+" or the shift-down position "−", the presently selected position is changed by one position. The five positions "D" through "L" have respective different lower limits of a range in which the overall speed ratio γT of the transmission mechanism 10 is automatically variable, that is, respective different lowest values of the overall speed ratio γT which corresponds to the highest output speed of the transmission mechanism 10. Namely, the five positions "D" through "L" select respective different numbers of the speed positions (gear positions) of the automatic transmission portion 20 which are automatically selectable, so that the lowest overall speed ratio γT available is determined by the selected number of the gear positions. The shift lever 48 is biased by biasing means such as a spring so that the shift lever 48 is automatically returned from the shift-up position "+" and shift-down position "−" back to the manual forward-drive position M. The shifting device 46 is provided with a shift-position sensor 49 configured to detect the presently selected position of the shift lever 48, so that signals indicative of the presently selected operating position of the shift lever 48 and the number of shifting operations of the shift lever 48 in the manual forward-shifting position M are applied to the electronic control device 40.

When the shift lever 48 is operated to the automatic forward-drive position D, the switching control means 50 effects an automatic switching control of the transmission mechanism 10 according to the stored switching boundary line map indicated in FIG. 6, and the hybrid control means 52 effects the continuously-variable shifting control of the power distributing mechanism 16, while the step-variable shifting control means 54 effects an automatic shifting control of the automatic transmission 20. When the transmission mechanism 10 is placed in the step-variable shifting state, for example, the shifting action of the transmission mechanism 10 is automatically controlled to select an appropriate one of the first through the fifth gear position indicated in FIG. 2. When the drive system is placed in the continuously-variable shifting state, the speed ratio of the power distributing mechanism 16 is continuously changed, while the shifting action of the automatic transmission 20 is automatically controlled to select an appropriate one of the first through fourth gear positions, so that the overall speed ratio γT of the transmission mechanism 10 is controlled so as to be continuously variable within the predetermined range. The automatic forward-drive position D is a position selected to establish an automatic shifting mode (automatic mode) in which the transmission mechanism 10 is automatically shifted.

When the shift lever 48 is operated to the manual forward-drive position M, on the other hand, the shifting action of the transmission mechanism 10 is automatically controlled by the switching control means 50, hybrid control means 52 and step-variable shifting control means 54, such that the overall speed ratio γT is variable within a predetermined range the lower limit of which is determined by the gear position having the lowest speed ratio, which gear position is determined by the manually selected one of the shift positions. When the transmission mechanism 10 is placed in the step-variable shifting state, for example, the shifting action of the transmission mechanism 10 is automatically controlled within the above-indicated predetermined range of the overall speed ratio γT. When the transmission mechanism 10 is placed in the step-variable shifting state, the speed ratio of the power distributing mechanism 16 is continuously changed, while the shifting action of the automatic transmission 20 is automatically controlled to select an appropriate one of the gear positions the number of which is determined by the manually selected one of the shift positions, so that the overall speed ratio γT of the transmission mechanism 10 is controlled so as to be continuously variable within the predetermined range. The manual forward-drive position M is a position selected to establish a manual shifting mode (manual mode) in which the selectable gear positions of the transmission mechanism 10 are manually selected.

As described above, the transmission mechanism 10 (differential portion 11 or power distributing mechanism 16) according to the present embodiment is switchable between the continuously-variable shifting state (differential state) and the non-continuously-variable shifting state (locked state). The differential portion 11 is selectively placed in one of the continuously-variable shifting state and the non-continuously-variable shifting state, under the control of the switching control means 50 according to its determination of the shifting state in which the differential portion 11 should be placed, While the differential portion 11 is placed in the locked state, the first electric motor M1, for example, is not required to receive the reaction torque corresponding to the engine torque $T_E$. While the differential portion 11 is placed in the differential state and functioning as the electrically controlled differential device, for example, as the electrically controlled continuously variable transmission, the first electric motor M1, for example, is required to receive the reaction torque corresponding to the engine torque $T_E$.

While the vehicle is running with the engine 8 operating under a high load, therefore, the amount of electric energy to be transmitted from the first electric motor M1 to the second electric motor M1 through the electric path increases with an increase of the amount of generation of electricity by the first electric motor M1, so that the output of the second electric motor M2 is accordingly increased. In a high-load low-speed vehicle running for a long time while towing a trailer, in particular, the amount of generation of electricity by the first electric motor M1 increases, and the amount of electric energy to be transmitted through the electric path increases, resulting in a rise of the temperatures of the inverter 58 and other components associated with the electric path including the first and second electric motors M1, M2, and an increase of the loads of those components associated with the electric path increase, and giving rise to a risk of deterioration of the functions and durability of the components.

To prevent a rise of the cooling water temperature $TEMP_{HV}$ in hybrid cooling device 62 provided for cooling the components (as shown in FIG. 5) associated with the electric path during a long high-load low-speed vehicle running, it is required to increase the cooling capacity of the hybrid cooling device 62. It is also required to increase the capacities of the components associated with the electric path, so that the components can withstand the high loads due to an increase of the amount of electric energy. However, meeting these requirements may cause increases of the sizes and weights of the hybrid cooling device 62 and the components associated with the electric path, unfavorably leading to an increase of the cost of manufacture of the vehicular drive system.

The hybrid cooling device 62 described above includes a hybrid radiator 63, and a hybrid water pump 64, so that a cooling water is delivered from the hybrid water pump 64 so as to flow through a coolant passage W indicated by broken line W, which passes the outer portions of the components such as the inverter 58 associated with the electric path including the first electric motor M1 and second electric motor M2, while the cooling water is cooled by the hybrid radiator 63. The hybrid radiator 63 is provided with a water-temperature sensor 65 for detecting the cooling water temperature $TEMP_{HV}$.

To detect the temperatures of the inverter 58 and other components associated with the electric path including the first and second electric motors M1, M2, a first-electric-motor temperature sensor 66 for detecting the first-electric-motor temperature $TEMP_{M1}$ and a second-electric-motor temperature sensor 68 for detecting the second-electric-motor temperature TEMPM2 are provided near the stator coils of the respective first and second electric motors M1, M2.

In view of the above, the present embodiment is arranged to place the differential portion 11 (power distributing mechanism 16 in the non-differential state (locked state), for preventing the transmission of an electric energy, when the amount of the electric energy transmitted through the electric path has increased to a predetermined thermal limit during an operation of the differential portion 11 in its continuously-variable shifting state as the electrically controlled continuously variable transmission. Namely, either the switching clutch C0 or the switching brake B0 is engaged so that the engaged switching clutch C0 or brake B0, rather than the first electric motor M1, receives the reaction torque corresponding the engine torque $T_E$, for thereby zeroing the generation of electricity by the first electric motor M1. This arrangement causes the entire engine torque $T_E$ to be mechanically transmitted through the differential portion 11, and prevents the transmission of an electric energy through the electric path, making it possible to restrict temperature rise of the components associated with the electric path, and reduce the loads of those components.

It is considered possible to restrict the temperature rise of the components associated with the electric path and reduce the loads of those components, by reducing the amount of the electric energy transmitted through the electric path, rather than by replacing the entirety of the electric energy transmitted through the electric path, with the mechanical energy.

That is, the amount of the electric energy transmitted through the electric path can be restricted by placing the switching clutch C0 or switching brake B0 in its partially power transmitting state or partially engaged state (partially slipping state), in stead of fully engaging the switching clutch C0 or switching brake B0 to place the differential portion 11 in its non-continuously-variable shifting state, in the case where the amount of transmission of the electric energy through the electric path has increased to the predetermined thermal limit while the differential portion 11 is placed in the continuously-variable shifting state and operated as the electrically controlled continuously variable transmission. Namely, the amount of generation of the electric energy by the first electric motor M1 is restricted by placing the switching clutch C0 or switching brake B0 in its partially engaged state so that not only the first electric motor M1 but also the switching clutch C0 or switching brake B0 receives the reaction torque corresponding to the engine torque $T_E$. In this way, a part of the engine toque $T_E$ that should be otherwise received by the first electric motor M1 can be mechanically transmitted through the differential portion 11, so that the amount of the electric energy transmitted through the electric path is restricted, making it possible to restrict the temperature rise of the components associated with the electric path, and to reduce the loads of those components. Placing the switching clutch C0 or switching brake B0 in its partially engaged state is one form of the method of limiting the differential function of the power distributing mechanism 16 for limiting the operation of the differential portion 11 as the electrically controlled differential device.

It is also noted that zeroing the amount of generation of the electric energy by the first electric motor M1 to zero the amount of the electric energy transmitted through the electric path is one form of the method of restricting the amount of generation of the electric energy by the first electric motor M1 to restrict the amount of the electric energy transmitted through the electric path. In this respect, zeroing the amount of generation of the electric energy by the first electric motor M1 is included in the method of restricting the amount of generation of the electric energy by the first electric motor M1 to restrict the amount of the electric energy transmitted through the electric path, unless otherwise specified in the description of the present embodiment.

The case where the amount of transmission of the electric energy through the electric path has increased to the thermal limit while the differential portion 11 is placed in the continuously-variable shifting state and operated as the electrically controlled continuously variable transmission is considered to include a case where the temperature of the inverter 58 and other components associated with the electric path including the first and second electric motors M1, M2 has risen to a predetermined upper limit or higher, for example, a case where at least one of the first-electric-motor temperature $TEMP_{M1}$ and the second-electric-motor temperature $TEMP_{M2}$ has risen to a predetermined upper limit TEMP1 or higher. The case where the amount of transmission of the electric energy through the electric path has increased to the thermal limit is considered to include also a case where the cooling water temperature $TEMP_{HV}$ has risen to a predetermined upper limit TEMP2. The predetermined upper limits TEMP1 and TEMP2 are threshold values obtained by experimentation to determine whether the amount of transmission of the electric energy through the differential portion has increased the thermal limit of the components associated with the electric path, in other words, to determine whether the amount of generation of electricity in the differential portion has exceeded a maximum permissible value of the components associated with the electric path.

Described in detail referring back to FIG. 5, differential-state determining means 80 is provided to determine whether the differential portion 11 is placed in the continuously-variable shifting state and operated as the electrically controlled continuously variable transmission. This determination by the differential-state determining means 80 is made on the basis of the vehicle condition represented by the vehicle speed V and the output torque $T_{OUT}$, and according to the switching control map which is indicated in FIG. 6 by way of example and which is used by the switching control means 50. The switching control map defines the step-variable shifting region in which the differential mechanism 10 should be placed in the step-variable shifting state, and the continuously-variable shifting region in which the differential mechanism 10 should be placed in the continuously-variable shifting state. The differential-state determining means 80 determines that the differential portion 11 is placed in the continuously-variable shifting state and operated as the electrically controlled continuously variable transmission, when the vehicle condition lies in the continuously-variable shifting region.

Thermal-limit determining means 82 is provided to determine whether the amount of transmission of the electric energy transmitted through the electric path has increased to the thermal limit. For instance, this determination is made by determining whether at least one of the first-electric-motor temperature $TEMP_{M1}$ and the second-electric-motor temperature $TEMP_{M2}$ is higher than the predetermined upper limit TEMP1, or alternatively whether the cooling water temperature $TEMP_{HV}$ of the hybrid cooling device 62 is higher than the predetermined upper limit TEMP2.

Electric-energy restriction control means 84 is provided to command the switching control means 50 to limit the differential function of the differential portion 11 by placing the differential portion 11 (power distributing mechanism 16) in the non-differential state (locked state) or alternatively placing the switching clutch C0 or switching brake B0 in its partially engaged state, for restricting the amount of the electric energy transmitted through the differential portion 11, when the differential-state determining means 80 has determined that the differential portion 11 is placed in the continuously-variable shifting state and operated as the electrically controlled continuously variable transmission, and when the thermal-limit determining portion 82 has determined that the amount of transmission of the electric energy has increased to the thermal limit.

According to the command received from the electric-energy restriction control means 84, the switching control means 50 commands the hydraulic control unit 42 to place the switching clutch C0 or switching brake B0 in its partially engaged state or fully engaged state.

The switching clutch C0 or switching brake B0 cannot be placed in the partially or fully engaged state by the switching control means 50 under some condition. For instance, the switching clutch C0 or switching brake B0 cannot be partially or fully engaged due to a failure of the friction members of the switching clutch C0 or brake B0, a failure of the appropriate solenoid-operated valve of the hydraulic control unit 42, or functional deterioration of the friction members or solenoid-operated valves, which causes a delayed operating response of the switching clutch C0 or brake B0.

In view of the above, the automatic transmission portion 20 is commanded to be shifted down for restricting the amount of the electric energy transmitted through the electric path, in the event that the switching clutch C0 or switching brake B0 cannot be brought into the partially or fully engaged state, when the amount of transmission of the electric energy through the electric path has increased to the predetermined thermal limit while the differential portion is placed in the continuously-variable shifting state and operated as the electrically controlled continuously variable transmission. That is, a shifting-down action of the automatic transmission portion 20 results in an increase of the speed ratio γ of the automatic transmission portion 20, so that output torque $T_{OUT}$ of the automatic transmission portion 20 remains unchanged even if the output torque of the differential portion 11 is reduced after the shift-down action. Accordingly, the amount of generation of electricity by the first electric motor M1 can be restricted by performing the shift-down action of the automatic transmission portion 20 and reducing the engine torque $T_E$. Thus, the amount of the electric energy transmitted through the electric path in the differential portion 11 is restricted, making it possible to restrict the temperature rise of the components associated with the electric path, and to reduce the loads of the components. However, the automatic transmission portion 20 may be commanded to be shifted sown irrespective of whether the switching clutch C0 or switching brake B0 cannot be partially or fully engaged, when the amount of the electric energy transmitted through the electric path has increased to the thermal limit while the differential portion 11 is placed in the continuously-variable shifting state and operated as the electrically controlled continuously variable transmission.

Described in detail, differential-limitation feasibility determining means 86 is provided to determine whether it is possible to place the differential portion 11 in the non-differential state for limiting the differential function of the differential portion 11, or whether it is possible to place the switching clutch C0 or switching brake B0 in the partially engaged state to limit the differential function of the differential portion 11. Namely, the differential-limitation feasibility determining means 86 is configured to determine whether the switching clutch C0 or switching brake B0 can be partially or fully engaged by the switching control means 50. For example, the differential-limitation feasibility determining means 86 make the determination as to whether the switching clutch C0 or switching brake B0 can be partially or fully engaged, depending upon whether there is a failure of the friction members or hydraulic actuator of the switching clutch C0 or brake B0, a failure of the solenoid-operated valve incorporated in the hydraulic control unit 42 to control the hydraulic actuator, or a delay operating response of the clutch C0 or brake B0 due to the functional deterioration or low oil temperature of the hydraulic actuator or solenoid-operated valve.

The electric-energy restriction control means 84 commands the step-variable shifting control means 54 to shift down the automatic transmission portion 20, for restricting the amount of the electric energy transmitted through the electric path, when the differential-limitation feasibility determining means 86 determines that the switching clutch C0 or switching brake B0 cannot be partially or fully engaged, as well as commands the switching control means 50 to place the differential portion 11 (power distributing mechanism 16) in the non-differential state (locked state) or to place the switching clutch C0 or brake B0 in the partially engaged state when the differential-limitation feasibility determining means 86 determines that the switching clutch C0 or brake B0 can be partially or fully engaged, where the thermal-limit determining means 82 determines that the amount of transmission of the electric energy through the electric path has increased to the predetermined thermal limit while the differential-state determining means 80 determines that the differential portion 11 is placed in the continuously-variable shifting state and operated as the electrically controlled continuously variable transmission. However, the electric-energy restriction control means 84 may be configured to command the step-variable shifting control means 54 to shift down the automatic transmission portion 20 for restricting the amount of the electric energy transmitted through the electric path, irrespective of whether the switching clutch C0 or switching brake B0 can be partially or fully engaged, as long as the thermal-limit determining means 82 determines that the amount of transmission of the electric energy through the electric path has increased to the thermal limit while the differential-state determining means 80 determines that the differential portion 11 is placed in the continuously-variable shifting state and operated as the electrically-controlled continuously variable transmission.

According to the command received from the electric-energy restriction control means 84, the step-variable shifting control means 54 commands the hydraulic control unit 42 to engage and release the respective two hydraulically operated frictional coupling devices for shifting down the automatic transmission portion 20, which two frictional coupling devices are selected according to the table of FIG. 2.

It is noted that the automatic transmission portion 20 cannot be shifted down under the control of the step-variable shifting control means 54. For example, the case where the automatic transmission portion 20 cannot be shifted down includes: a case where the shift-down action causes the engine speed $N_E$ to exceed a permissible maximum value (where the engine 8 suffers from an excessively high speed operation); a case where the shift-down action causes engine braking to the vehicle and a consequent vehicle deceleration value exceeding an upper limit; a case where a shifting action of the automatic transmission portion 20 is inhibited during an operation of a VSC system (Vehicle Stability Control System) to control the engine torque $T_E$ or the braking force of each wheel so as to improve the turning or cornering stability of the vehicle; and a case where there is a failure of the friction members of the coupling devices for the shift-down action, a failure of the solenoid-operated valve in the hydraulic control unit 42 or a delayed operating response of the automatic transmission portion 20 due to a functional deterioration of the frictional members or solenoid-operated valve.

In view of the above, the present embodiment is arranged to reduce the engine torque for restricting the amount of transmission of the electric energy through the electric path, where the switching clutch C0 or switching brake B0 cannot be partially or fully engaged and where the automatic transmission portion 20 cannot be shifted down, when the amount of the electric energy transmitted through the electric path has increased to the thermal limit in the continuously-variable shifting state of the differential portion 11 in which the differential portion 11 is operated as the electrically controlled continuously variable transmission. Namely, the engine torque $T_E$ is reduced to restrict the amount of generation of electricity by the first electric motor M1, so that the amount of the electric energy transmitted through the electric path in the differential portion 11 is restricted to restrict the temperature rise of the components associated with the electric path and to reduce the loads of those components.

Described in detail, shift-down-action feasibility determining means 88 is provided to determine whether the automatic transmission portion 20 can be shifted down. For instance, the shift-down-action feasibility determining means 88 makes the determination as to whether the shift-down action of the automatic transmission portion 20 is possible, by determining whether the shift-down action causes the excessively high speed operation of the engine 8 or the engine braking to the vehicle and consequent vehicle deceleration exceeding the upper limit, or whether the shift-down action is inhibited during the operation of the VSC system. The shift-down-action feasibility determining means 88 is also arranged to make the determination as to whether the shift-down action of the automatic transmission portion 20 is possible, by determining whether there is a failure of the friction members or hydraulic actuator of the coupling devices for the shift-down action, a failure of the solenoid-operated valve in the hydraulic control unit 42 to control the hydraulic actuator, or a delayed operating response of the automatic transmission portion 20 due to a functional deterioration or low oil temperature of the hydraulic actuator and the solenoid-operated valve.

Engine-torque limiting means 90 is provided to command the hybrid control means 52 to limit the engine torque $T_E$ so as not to exceed a predetermined upper limit $T_{TC}$ obtained by experimentation, on the basis of a balance to the cooling capacity of the hybrid cooling device 62, for preventing rises of the first-electric-motor temperature $TEMP_{M1}$, second-electric-motor temperature $TEMP_{M2}$ and cooling water temperature $TEMP_{HV}$ from the present levels.

According to the command received from the engine-torque limiting means 90, the hybrid control means 52 commands the engine output control device 43 to reduces the opening angle of the electronic throttle valve 96 or the amount of fuel supply from the fuel injecting device 98, or retard the timing of ignition of the engine 8 by the ignition device 99, or to effect a combination of the reductions of the valve opening angle and the fuel supply amount and the retardation of the ignition timing, for thereby limiting the engine torque $T_E$ so as not to exceed the upper limit $T_{TC}$.

Figure 10:
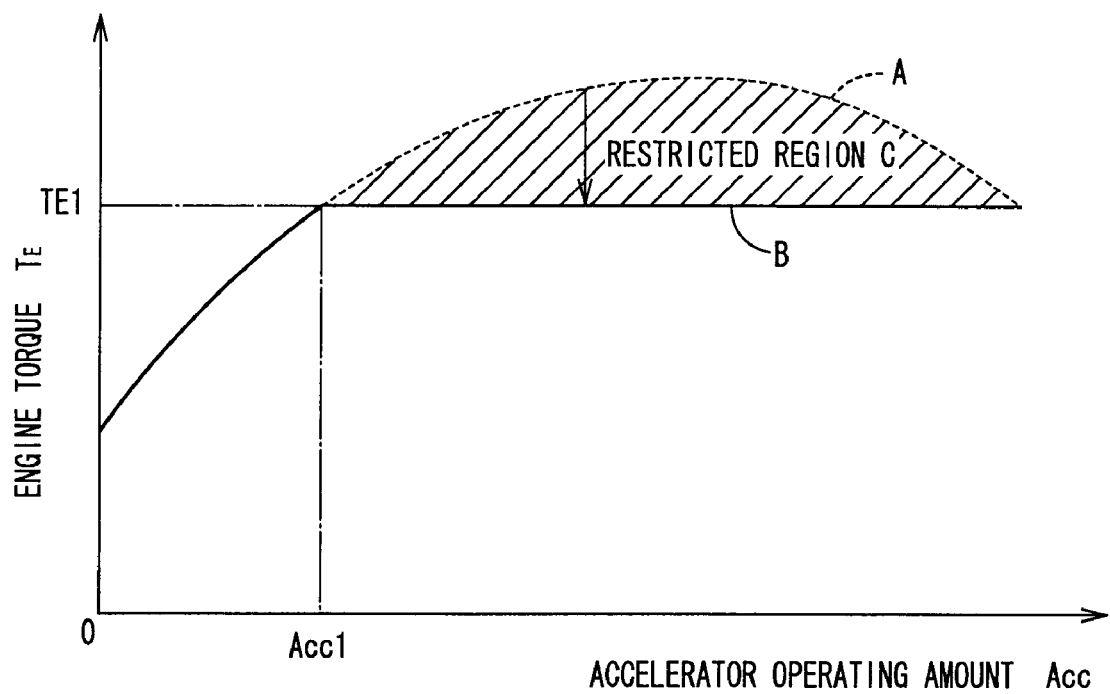
FIG. 10 is a view showing an example of an output characteristic of an engine torque in relation to an operating amount of an accelerator pedal.

FIG. 10 shows an example of an output characteristic (indicated by solid line A and broken line A) of the engine torque $T_E$ in relation to the operating amount $A_{CC}$ of the accelerator pedal. As indicated by a hatched area in FIG. 10, the engine torque $T_E$ exceeds the predetermined upper limit $T_{TC}$ when the operating amount $A_{CC}$ of the accelerator pedal exceeds a predetermined value $A_{CC1}$. The hatched area corresponds to a high-torque region (indicted by broken line A), which is a restricted region C in which the actual engine torque $T_E$ is held not larger than the predetermined upper limit $T_{TC}$ (indicated by solid line B), to prevent the rises of the first-electric-motor temperature $TEMP_{M1}$, the second-electric-motor temperature $TEMP_{M2}$ and the cooling water temperature $TEMP_{HV}$ from the present levels.

The above-described electric-energy limiting means 84 commands the engine-torque limiting means 90 limit the engine torque $T_E$, for restricting the amount of the electric energy transmitted through the electric path, when the shift-down action feasibility determining means 88 determines that the shift-down action of the automatic transmission portion 20 is not possible, as well as commands the step-variable shifting control means 54 to shift down the automatic transmission 20 when the shift-down action feasibility determining means 88 determines that the shift-down action of the automatic transmission portion 20 is possible, where the differential-limitation feasibility determining means 86 determines that the switching clutch C0 or switching brake B0 cannot be partially or fully engaged, when the thermal-limit determining means 82 determines that the amount of transmission of the electric energy through the electric path has increased to the predetermined thermal limit while the differential-state determining means 80 determines that the differential portion 11 is placed in the continuously-variable shifting state and operated as the electrically controlled continuously variable transmission.

According to the command received from the electric-energy restriction control means 84, the engine-torque limiting means 90 commands the hybrid control means 52 to limit the engine torque $T_E$ not to exceed the predetermined upper limit $T_{TC}$, so that the engine torque $T_E$ is restricted.

Figure 11:
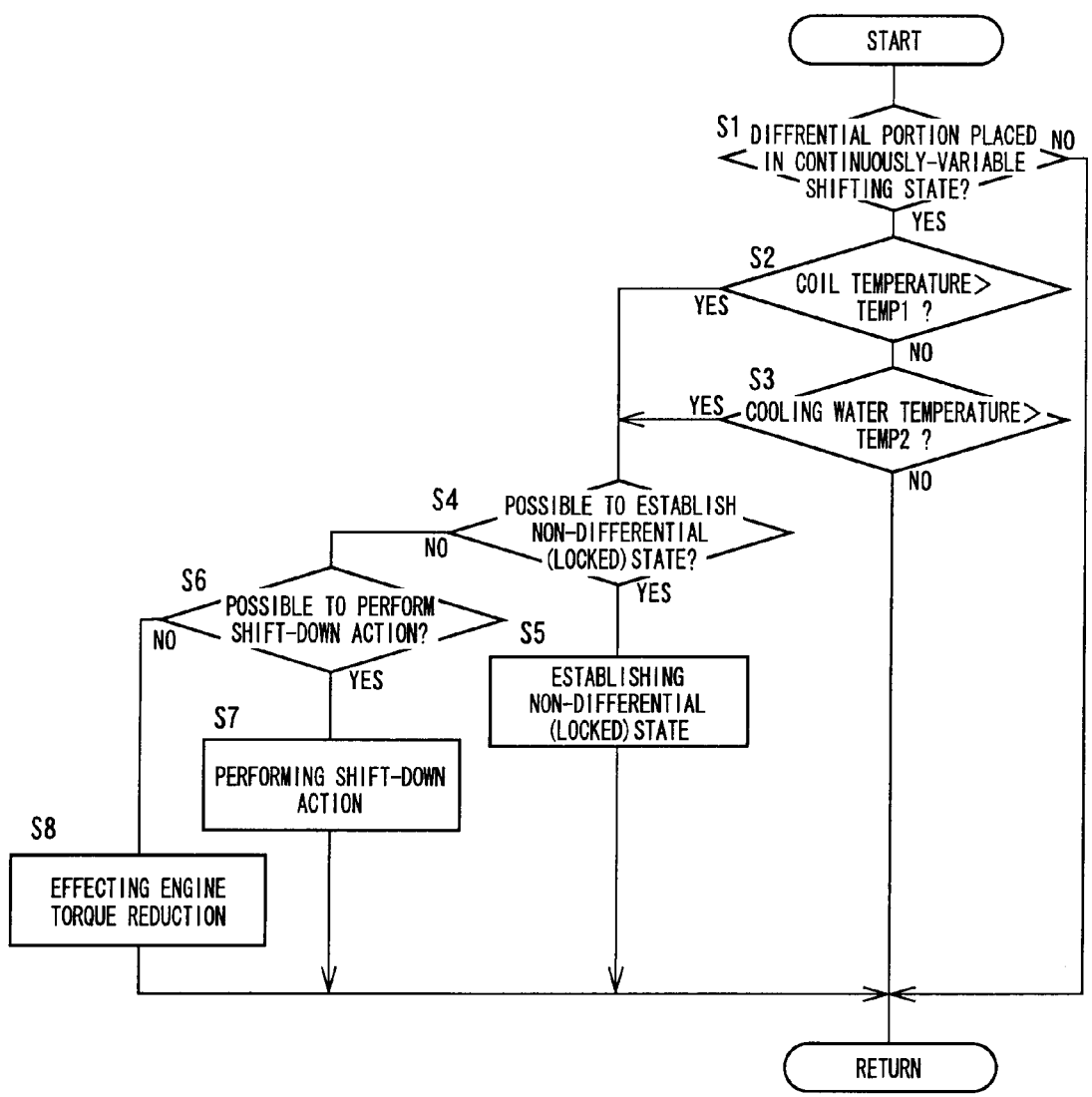
FIG. 11 is a flow chart illustrating a control operation of the electronic control device of FIG. 4, that is, a control operation to restrict transmission of an electric energy through a differential portion placed in its continuously-variable shifting state, when the amount of transmission of the electric energy has increased to a thermal limit.

FIG. 11 is a flow chart a control operation of the electronic control device 40, that is, a control operation to restrict the amount of transmission of the electric energy through the differential portion 11 placed in its continuously-variable shifting state (differential state), when the amount of transmission of the electric energy has increased to the predetermined thermal limit. This control operation is repeatedly executed with an extremely short cycle time of about several milliseconds to several tens of milliseconds.

The control operation is initiated with step S1 ("step" being hereinafter omitted) corresponding to the differential-state determining means 80, to determine whether the differential portion 11 is placed in its continuously-variable shifting state and operated as the electrically controlled continuously variable transmission.

If a negative determination is obtained in S1, the present control routine is terminated. If an affirmative determination is obtained in S1, the control flow goes to S2 corresponding to the thermal-limit determining means 82, to determine whether the amount of transmission of the electric energy through the electric path has increased to the predetermined thermal limit. For example, this determination is made by determining whether at least one of the first-electric-motor temperature $TEMP_{M1}$ and the second-electric-motor temperature $TEMP_{M2}$ is higher than the upper limit TEMP1.

If a negative determination is obtained in S2, the control flow goes to S3 corresponding to the thermal-limit determining means 82, to determine whether the amount of transmission of the electric energy through the electric path has increased to the thermal limit. For example, this determination is made by determining whether the cooling water temperature $TEMP_{HV}$ is higher than the predetermined upper limit TEMP2.

If an affirmative determination is obtained in S2 or S3, the control flow goes to S4 corresponding to the differential-limitation feasibility determining means 86, to determine whether it is possible to place the differential portion 11 in the non-differential state, or whether it is possible to place the switching clutch C0 or switching brake B0 in the partially engaged state. For instance, the determination as to whether it is possible to partially or fully engage the switching clutch C0 or brake B0 is made by determining whether there is a failure of the friction members or hydraulic actuator of the switching clutch C0 or brake B0, a failure of the solenoid-operated valve incorporated in the hydraulic control circuit 42 to control the hydraulic actuator, or a delayed operating response of the switching clutch C0 or brake B0 due to functional deterioration or low oil temperature of the hydraulic actuator or solenoid-operated valve.

If an affirmative determination is obtained in S4, the control flow goes to S5 corresponding to the electric-energy restriction control means 84, to command the switching control means 50 to place the differential portion 11 (power distributing mechanism 16) in the non-differential state (locked state) or place the switching clutch C0 or switching brake B0 in the partially engaged state. According to the command received from the electric-energy restriction control means 84, the switching control means 50 commands the hydraulic control unit 42 to partially or fully engage the switching clutch C0 or brake B0.

If a negative determination is obtained in S4, the control flow goes to S6 corresponding to the shift-down-action feasibility determining means 88, to determine whether it is possible to shift down the automatic transmission portion 20. For instance, this determination as to whether the shift-down action of the automatic transmission portion 20 is possible is made by determining whether the shift-down action causes an excessively high speed operation of the engine 8 or the engine braking to the vehicle and consequent vehicle deceleration exceeding the upper limit, or whether the shift-down action is inhibited during the operation of the VSC system. Alternatively, the determination as to whether the shift-down action of the automatic transmission portion 20 is possible is made by determining whether there is a failure of the friction members or hydraulic actuator of the coupling devices for the shift-down action, a failure of the solenoid-operated valve incorporated in the hydraulic control unit 42 to control the hydraulic actuator, or a delayed operating response of the automatic transmission portion 20 due to functional deterioration or low oil temperature of the hydraulic actuator or solenoid-operated valve.

If an affirmative determination is obtained in S6, the control flow goes to S7 corresponding to the electric-energy restriction control means 84, to command the step-variable shifting control means 54 to shift down the automatic transmission portion 20. According to the command received from the electric-energy restriction control means 84, the step-variable shifting control means 54 commands the hydraulic control unit 42 to engage and release the appropriate hydraulically operated coupling devices for shift down the automatic transmission portion 20.

If a negative determination is obtained in S6, the control flow goes to S8 corresponding the electric-energy restriction control means 84, to command the engine-torque limiting means 90 to restrict the engine torque $T_E$. According to the command received from the electric-energy restriction control means 84, the engine-torque limiting means 90 commands the hybrid control means 52 to restrict the engine torque $T_E$ so as not to exceed the predetermined upper limit $T_{TC}$.

In the present embodiment, the differential portion 11 is switchable between the continuously-variable shifting state and the non-continuously-variable shifting state, by the differential limiting device in the form of the switching clutch C0 or switching brake B0 operable to limit the operation of the differential portion 11 as the electrically controlled differential device. Accordingly, the vehicular drive system has both an advantage of improved fuel economy provided by a transmission the speed ratio of which is electrically variable, and an advantage of high power transmitting efficiency provided by a gear type power transmitting device constructed for mechanical transmission of power.

When the differential portion 11 is placed in the continuously-variable shifting state in a normal output state of the engine during a low-speed or medium-speed running or a low-output or medium-output running of the vehicle, for example, the fuel economy of the vehicle is improved. When the differential portion 11 is placed in the non-continuously-variable shifting state during a high-speed running of the vehicle, the output of the engine 8 is transmitted to the drive wheels primarily through the mechanical power transmitting path, so that the fuel economy is improved owing to reduction of a loss of conversion of the mechanical energy into the electric energy, which would take place when the differential portion 11 is operated as a transmission the speed ratio of which is electrically variable. Where the differential portion 11 is placed in the non-continuously-variable shifting state during a high-output running state of the vehicle, the differential portion 11 is operated as a transmission the speed ratio of which is electrically variable, only when the vehicle speed or output is relatively low or medium, so that the required amount of electric energy generated by the first electric motor M1, that is, the maximum amount of electric energy that must be transmitted from the first electric motor M1 can be reduced, making it possible to minimize the required sizes of the first electric motor, and the second electric motor M2 operated by the electric energy received from the first electric motor M1, and the required size of the transmission mechanism 10 including the first and second electric motors.

Further, the differential portion 11 (power distributing mechanism 16) is placed in the non-differential state (locked state), or the switching clutch C0 or switching brake B0 is placed in the partially engaged state, under the control of the electric-energy restriction control means 84, to restrict the amount of electric energy transmitted through the differential portion 11, when the amount of transmission of the electric energy through the differential portion 11 has increased to the thermal limit while the differential portion 11 is operated as the electrically controlled continuously variable transmission (electrically controlled differential device), for example, when at least one of the first-electric-motor temperature $TEMP_{M1}$ and the second-electric-motor temperature $TEMP_{M2}$ is higher than the predetermined upper limit TEMP1, or when the cooling water temperature $TEMP_{HV}$ of the hybrid cooling device 62 is higher than the predetermined upper limit TEMP2. Accordingly, the switching clutch C0 or switching brake B0 can receive the reaction torque corresponding to the engine torque $T_E$, so that the reaction torque that must be received by the first electric motor M1 to enable the differential portion 11 to operate as the electrically controlled continuously variable transmission can be restricted. As a result, the amount of generation of electricity by the first electric motor M1 is reduced, and the amount of the electric energy transmitted through the electric path is accordingly reduced, making it possible to restrict temperature rises of the components associated with the electric path including the first and second electric motors M1, M2, so that the required size of the cooling system for cooling those components can be reduced. Further, the loads of the components associated with the electric path including the first and second electric motors M1, M2 can be reduced, so that the durability of the components associated with the electric path including the first and second electric motors M1, M2 can be improved.

The present embodiment is further arranged such that the determination as to whether the amount of transmission of the electric energy transmitted through the electric path in the differential portion has increased to the thermal limit can be easily made by the thermal-limit determining means 82 by determining whether the at least one of the first-electric-motor temperature $TEMP_{M1}$ and the second-electric-motor temperature $TEMP_{M2}$ is higher than the predetermined upper limit TEMP1.

The determination as to whether the amount of transmission of the electric energy transmitted through the electric path in the differential portion has increased to the thermal limit can also be easily made by the thermal-limit determining means 82 by determining whether the cooling water temperature $TEMP_{HV}$ of the hybrid cooling device 62 is higher than the predetermined upper limit TEMP2.

The present embodiment is further arranged such that the electric-energy restriction control means 84 commands the automatic transmission portion 20 to perform a shift-down action when the differential portion 11 (power distributing mechanism 16) cannot be placed in the non-differential state (locked state) or when the switching clutch C0 or switching brake B0 cannot be placed in the partially engaged state while the amount of transmission of the electric energy through the differential portion 11 is larger than the thermal limit. Accordingly, the output torque of the differential portion 11 is reduced after the shift-down action of the automatic transmission portion 20, by an amount corresponding to an increase of the speed ratio of the transmission portion 20, provided the output torque $T_{OUT}$ of the automatic transmission portion 20 is kept constant before and after the shift-down action. Therefore, the engine torque $T_E$ can be reduced after the shift-down action, and the reaction torque which corresponds to the engine torque $T_E$ and which must be received by the first electric motor M1 can be reduced. Accordingly, the amount of generation of electricity by the first electric motor M1 is reduced, and the amount of transmission of the electric energy transmitted through the electric path is accordingly reduced, so that the temperature rise of the components associated with the electric path including the first and second electric motors M1, M2 is restricted, whereby the required size of the cooling system for cooling those components can be reduced. Further, the loads of the components associated with the components associated with the electric path including the first and second electric motors M1, M2 can be reduced, so that the durability of the components associated with the electric path including the first and second electric motors M1, M2 can be improved.

The present embodiment is also arranged such that the engine torque TE is reduced under the control of the electric-energy restriction control means 84 when the differential portion 11 (power distributing mechanism 16) cannot be placed in the non-differential state (locked state) or when the switching clutch C0 or switching brake B0 cannot be placed in the partially engaged state, and when the shift-down action of the automatic transmission portion 20 cannot be performed. Accordingly, the reaction torque which corresponds to the engine torque TE and which must be received by the first electric motor M1 can be reduced. Therefore, the amount of generation of electricity by the first electric motor M1 is reduced, and the amount of transmission of the electric energy through the electric path is accordingly reduced, so that the temperature rise of the components associated with the electric path including the first and second electric motors M1, M2 is restricted, and the required size of the cooling system for cooling those components can be reduced. Further, the loads of the components associated with the electric path including the first and second electric motors M1, M2 can be reduced, so that the durability of the components associated with the electric path including the first and second electric motors M1, M2 can be improved.

The present embodiment is further arranged such that the electric-energy restriction control means 84 commands the automatic transmission portion 20 to perform the shift-down action to restrict the amount of the electric energy transmitted through the differential portion 11, when the amount of transmission of the electric energy through the differential portion 11 operating as the electrically controlled continuously variable transmission (electrically controlled differential device) has increased to the predetermined thermal limit. In this case, the output torque Tour of the differential portion 11 is reduced after the shift-down action of the automatic transmission portion 20, by the amount corresponding to the increase of the speed ratio of the automatic transmission portion 20, provided the output torque $T_{OUT}$ of the automatic transmission portion 20 is kept constant before and after the shift-down action. Accordingly, the engine torque $T_E$ can be reduced after the shift-down action, and the reaction torque which corresponds to the engine torque $T_E$ and which must be received by the first electric motor M1 can be reduced. Therefore, the amount of generation of electricity by the first electric motor M1 is reduced, and the amount of transmission of the electric energy transmitted through the electric path is accordingly reduced, so that the temperature rise of the components associated with the electric path including the first and second electric motors M1, M2 is restricted, whereby the required size of the cooling system for cooling those components can be reduced. Further, the loads of the components associated with the components associated with the electric path including the first and second electric motors M1, M2 can be reduced, so that the durability of the components associated with the electric path including the first and second electric motors M1, M2 can be improved.

The other embodiments of this invention will be described. In the following description, the same reference signs as used in the preceding embodiment will be used to identify the same elements, which will not be described.

Embodiment 2

In the preceding embodiment, the thermal-limit determining means 82 is arranged to make the determination as to whether the amount of the electric energy transmitted through the electric path has increased to the thermal limit, by determining whether at least one of the first-electric-motor temperature $TEMP_{M1}$ and the second-electric-motor temperature $TEMP_{M2}$ is higher than the predetermined upper limit TEMP1. In the present embodiment, however, the thermal-limit determining means 82 is arranged to make the above-indicated determination, by estimating a value of at least one of the first-electric-motor temperature $TEMP_{M1}$ and second-electric-motor temperature $TEMP_{M2}$, (hereinafter collectively referred to as "electric motor temperature $TEMP_M$") and determining whether the estimated value is higher than the predetermined upper limit TEMP1.

Figure 12:
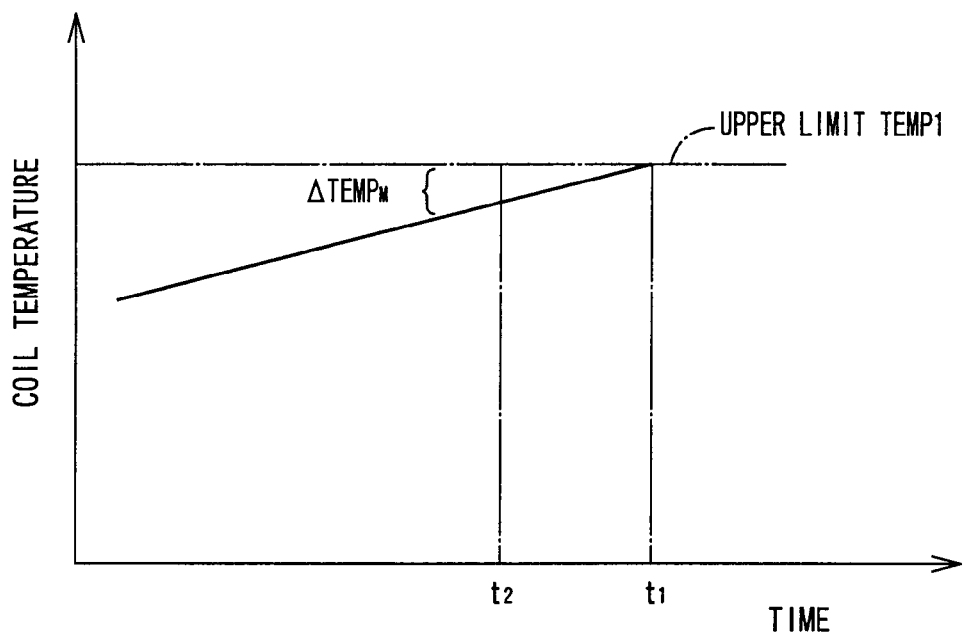
FIG. 12 is a view indicating an example of a change of temperature of an electric motor.

FIG. 12 indicates an example of a change of the electric motor temperature $TEMP_M$. As indicated in FIG. 12, the thermal-limit determining means 82 is configured to calculate an estimated value $TEMP_{Mt}$ of the electric motor temperature $TEMP_M$ at a moment a predetermined time $t_M$ after the present moment t1, on the basis of a rate of change $\Delta TEMP_M$ of the electric motor temperature $TEMP_M$ during a period between a point of time t2 and the point of time t1, and to make the determination as to whether the amount of transmission of the electric energy through the electric path has increased to the predetermined thermal limit, by determining whether the calculated estimated value $TEMP_{Mt}$ is higher than the predetermined upper limit TEMP1.

In the preceding embodiment, the thermal-limit determining means 82 is further arranged to make the determination as to whether the amount of transmission of the electric energy through the electric path has increased to the thermal limit, by determining whether the cooling water temperature $TEMP_{HV}$ of the hybrid cooling device 62 is higher than the predetermined upper limit TEMP2. In the present embodiment, however, the thermal-limit determining means 82 is arranged to make the above-indicated determination, by estimating a value of the cooling water temperature $TEMP_{HV}$ and determining whether the estimated value is higher than the predetermined upper limit TEMP2.

Figure 13:
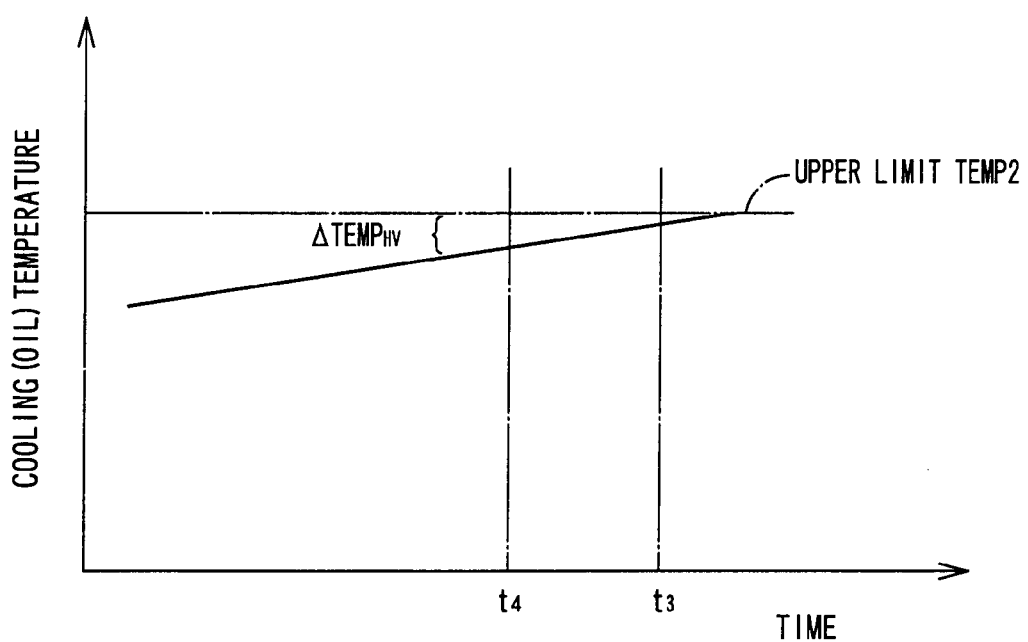
FIG. 13 is a view indicating an example of a change of temperature of a cooling.

FIG. 13 indicates an example of a change of the cooling water temperature $TEMP_{HV}$. As indicated in FIG. 13, the thermal-limit determining means 82 is configured to calculate an estimated value $TEMP_{HVt}$ of the cooling water temperature $TEMP_{HV}$ at a moment a predetermined time $t_{HV}$ after the present moment t3, on the basis of a rate of change $\Delta TEMP_{HV}$ of the cooling water temperature $TEMP_{HV}$ during a period between a point of time t4 and the point of time t3, and to make the determination as to whether the amount of transmission of the electric energy through the electric path has increased to the predetermined thermal limit, by determining whether the calculated estimated value $TEMP_{HVt}$ is higher than the predetermined upper limit TEMP2.

In this embodiment, too, the thermal-limit determining means 82 can easily make the determination as to whether the amount of transmission of the electric energy through the electric path in the differential portion has increased to the thermal limit, by determining whether the estimated value $TEMP_{Mt}$ of the electric motor temperature $TEMP_M$ is higher than the predetermined upper limit TEMP1, or whether the estimated value $TEMP_{HVt}$ of the cooling water temperature $TEMP_{HV}$ is higher than the predetermined upper limit TEMP2.

Embodiment 3

Figures 14, 15:
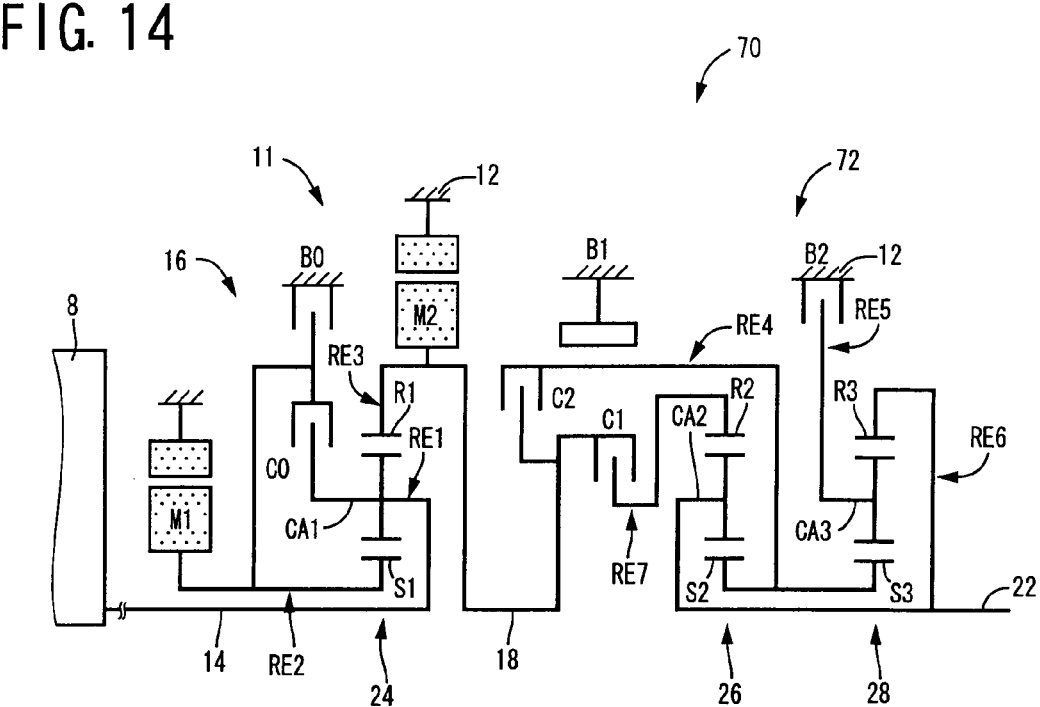
FIG. 14 is a schematic view corresponding to that of FIG. 1, showing an arrangement of a hybrid vehicle drive system according to another embodiment of this invention.
FIG. 15 is a table corresponding to that of FIG. 2, indicating shifting actions of the hybrid vehicle drive system of FIG. 14 in a selected one of the continuously-variable and step-variable shifting states, in relation to different combinations of operating states of hydraulically operated frictional coupling devices to effect the respective shifting actions.
Figure 16:
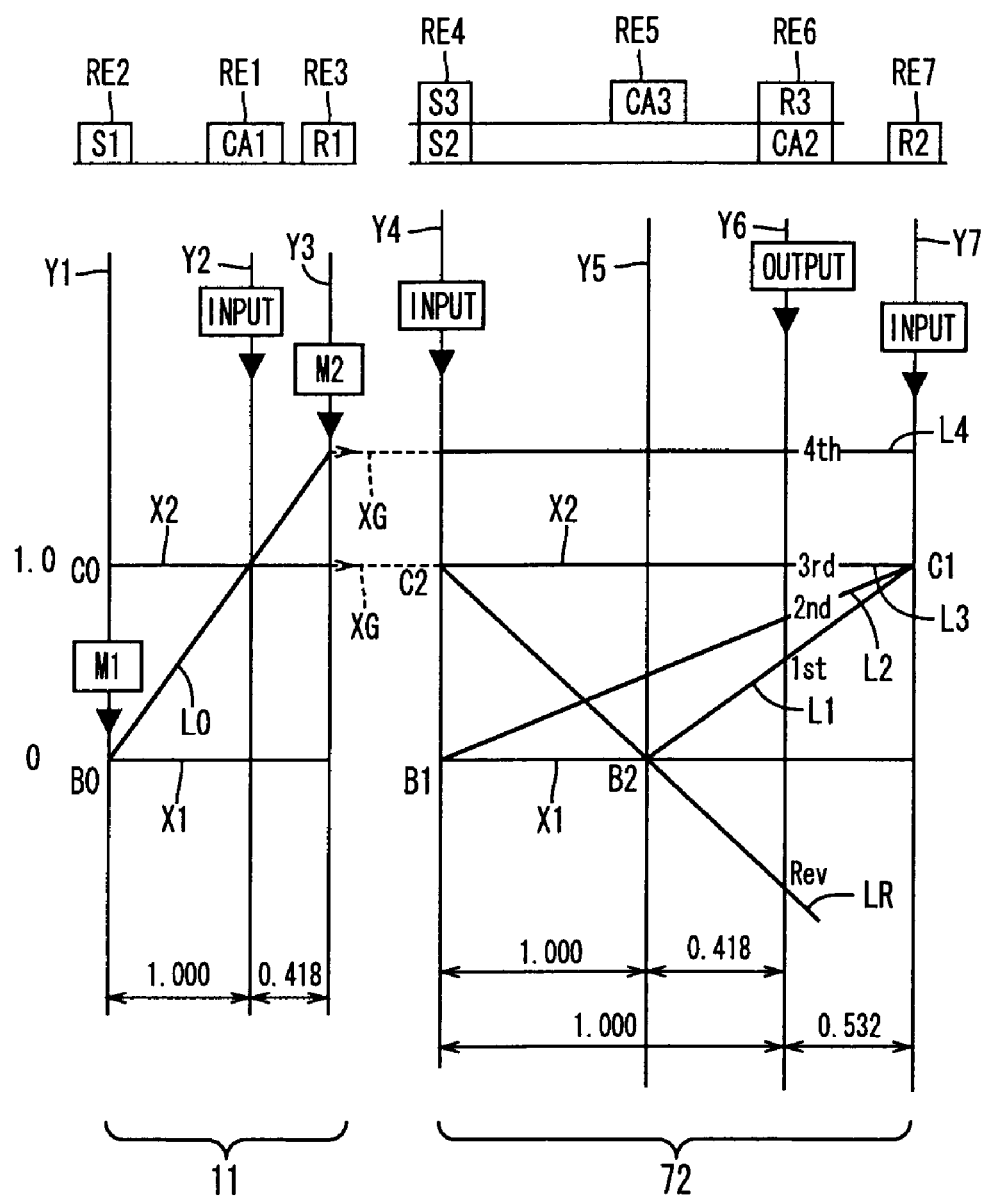
FIG. 16 is a collinear chart corresponding to that of FIG. 3, indicating relative rotating speeds of the rotary elements of the hybrid vehicle drive system of FIG. 14 in the step-variable shifting state, in the different gear positions.

FIG. 14 shows an arrangement of a transmission mechanism 70 in another embodiment of this invention, and FIG. 15 a table indicating a relationship between the gear positions of the transmission mechanism 70 and different combinations of engaged states of the hydraulically operated frictional coupling devices for respectively establishing those gear positions, while FIG. 16 is a collinear chart for explaining a shifting operation of the transmission mechanism 70.

The transmission mechanism 70 includes the differential portion 11 having the first electric motor M1, power distributing mechanism 16 and second electric motor M2, as in the preceding embodiment. The transmission mechanism 70 further includes an automatic transmission portion 72 having three forward drive positions. The automatic transmission portion 72 is disposed between the differential portion 11 and the output shaft 22 and is connected in series to the differential portion 11 and output shaft 22 through the power transmitting member 18. The power distributing mechanism 16 includes the single-pinion type first planetary gear set 24 having a gear ratio ρ1 of about 0.418, for example, and the switching clutch C0 and the switching brake B0. The automatic transmission portion 72 includes the single-pinion type second planetary gear set 26 having a gear ratio ρ2 of about 0.532, for example, and the single-pinion type third planetary gear set 28 having a gear ratio ρ3 of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch C1, and the third carrier CA3 is selectively fixed to the casing 12 through the second brake B2.

In the transmission mechanism 70 constructed as described above, one of a first gear position (first speed position) through a fourth gear position (fourth speed position), a reverse gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 15. Those gear positions have respective speed ratios γ(input shaft speed $N_{IN}$/output shaft speed $N_{OUT}$) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having fixed speed ratio or ratios, as well as in the continuously-variable shifting state in which the mechanism 16 is operable as the continuously variable transmission described above. In the present transmission mechanism 70, therefore, a step-variable transmission is constituted by the transmission portion 72, and the differential portion 11 which is placed in the fixed-speed-ratio shifting state by engagement of the switching clutch C0 or switching brake B0. Further, a continuously variable transmission is constituted by the transmission portion 72, and the differential portion 11 which is placed in the continuously-variable shifting state, with none of the switching clutch C0 and brake B0 being engaged. In other words, the transmission mechanism 70 is switched to the step-variable shifting state, by engaging one of the switching clutch C0 and switching brake B0, and to the continuously-variable shifting state by releasing both of the switching clutch C0 and switching brake B0.

Where the transmission mechanism 70 functions as the step-variable transmission, for example, the first gear position having the highest speed ratio γ1 of about 2.804, for example, is established by engaging actions of the switching clutch C0, first clutch C1 and second brake B2, and the second gear position having the speed ratio γ2 of about 1.531, for example, which is lower than the speed ratio γ1, is established by engaging actions of the switching clutch C0, first clutch C1 and first brake B1, as indicated in FIG. 15. Further, the third gear position having the speed ratio γ3 of about 1.000, for example, which is lower than the speed ratio γ2, is established by engaging actions of the switching clutch C0, first clutch C1 and second clutch C2, and the fourth gear position having the speed ratio γ4 of about 0.705, for example, which is lower than the speed ratio γ3, is established by engaging actions of the first clutch C1, second clutch C2, and switching brake B0. Further, the reverse gear position having the speed ratio γR of about 2.393, for example, which is intermediate between the speed ratios γ1 and γ2, is established by engaging actions of the second clutch C2 and the second brake B2. The neutral position N is established by engaging only the switching clutch C0.

When the transmission mechanism 70 functions as the continuously-variable transmission, on the other hand, the switching clutch C0 and the switching brake B0 are both released, as indicated in FIG. 15, so that the differential portion 11 functions as the continuously variable transmission, while the automatic transmission portion 72 connected in series to the differential portion 11 functions as the step-variable transmission, whereby the speed of the rotary motion transmitted to the automatic transmission portion 72 placed in one of the first through third gear positions, namely, the rotating speed of the power transmitting member 18 is continuously changed, so that the speed ratio of the transmission mechanism 70 when the automatic transmission portion 72 is placed in one of those gear positions is continuously variable over a predetermined range. Accordingly, the total speed ratio of the automatic transmission portion 72 is continuously variable across the adjacent gear positions, whereby the overall speed ratio γT of the transmission mechanism 70 a whole is continuously variable.

The collinear chart of FIG. 16 indicates, by straight lines, a relationship among the rotating speeds of the rotary elements in each of the gear positions of the transmission mechanism 70, which is constituted by the differential portion 11 functioning as the continuously-variable shifting portion or first shifting portion, and the automatic transmission portion 72 functioning as the step-variable shifting portion or second shifting portion. The collinear chart of FIG. 16 indicates the rotating speeds of the individual elements of the power distributing mechanism 16 when the switching clutch C0 and brake B0 are both released, and the rotating speeds of those elements when the switching clutch C0 or brake B0 is engaged, as in the preceding embodiment.

In FIG. 16, four vertical lines Y4, Y5, Y6 and Y7 corresponding to the automatic transmission portion 72 and arranged in the rightward direction respectively represent the relative rotating speeds of a fourth rotary element (fourth element) RE4 in the form of the second and third sun gears S2, S3 integrally fixed to each other, a fifth rotary element (fifth element) RE5 in the form of the third carrier CA3, a sixth rotary element (sixth element) RE6 in the form of the second carrier CA2 and third ring gear R3 that are integrally fixed to each other, and a seventh rotary element (seventh element) RE7 in the form of the second ring gear R2. In the automatic transmission portion 72, the fourth rotary element RE4 is selectively connected to the power transmitting member 18 through the second clutch C2, and is selectively fixed to the casing 12 through the first brake B1, and the fifth rotary element RE5 is selectively fixed to the casing 12 through the second brake B2. The sixth rotary element RE6 is fixed to the output shaft 22 of the automatic transmission portion 72, and the seventh rotary element RE7 is selectively connected to the power transmitting member 18 through the first clutch C1.

When the first clutch C1 and the second brake B2 are engaged, the automatic transmission portion 72 is placed in the first gear position. The rotating speed of the output shaft 22 in the first gear position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 (R2) and the horizontal line X2, and a point of intersection between the vertical line Y5 indicative of the rotating speed of the fifth rotary element RE5 (CA3) and the horizontal line X1, as indicated in FIG. 16. Similarly, the rotating speed of the output shaft 22 in the second gear position established by the engaging actions of the first clutch C1 and first brake B1 is represented by a point of intersection between an inclined straight line L2 determined by those engaging actions and the vertical line Y6 indicative of the rotating speed of the sixth rotary element RE6 (CA2, R3) fixed to the output shaft 22. The rotating speed of the output shaft 22 in the third speed position established by the engaging actions of the first clutch C1 and second clutch C2 is represented by a point of intersection between an inclined straight line L3 determined by those engaging actions and the vertical line Y6 indicative of the rotating speed of the sixth rotary element RE6 fixed to the output shaft 22. In the first through third gear positions in which the switching clutch C0 is placed in the engaged state, the seventh rotary element RE7 is rotated at the same speed as the engine speed $N_E$, with the drive force received from the differential portion 11. When the switching brake B0 is engaged in place of the switching clutch C0, the sixth rotary element RE6 is rotated at a speed higher than the engine speed $N_E$, with the drive force received from the differential portion 11. The rotating speed of the output shaft 22 in the fourth gear position established by the engaging actions of the first clutch C1, second clutch C2 and switching brake B0 is represented by a point of intersection between a horizontal line L4 determined by those engaging actions and the vertical line Y6 indicative of the rotating speed of the sixth rotary element RE6 fixed to the output shaft 22.

The transmission mechanism 70 according to the present embodiment is also constituted by the differential portion 11 functioning as the continuously-variable shifting portion or first shifting portion, and the automatic transmission portion 72 functioning as the step-variable (automatic) shifting portion or second shifting portion, so that the present transmission mechanism 70 has advantages similar to those of the first embodiment.

Embodiment 4

Figure 17:
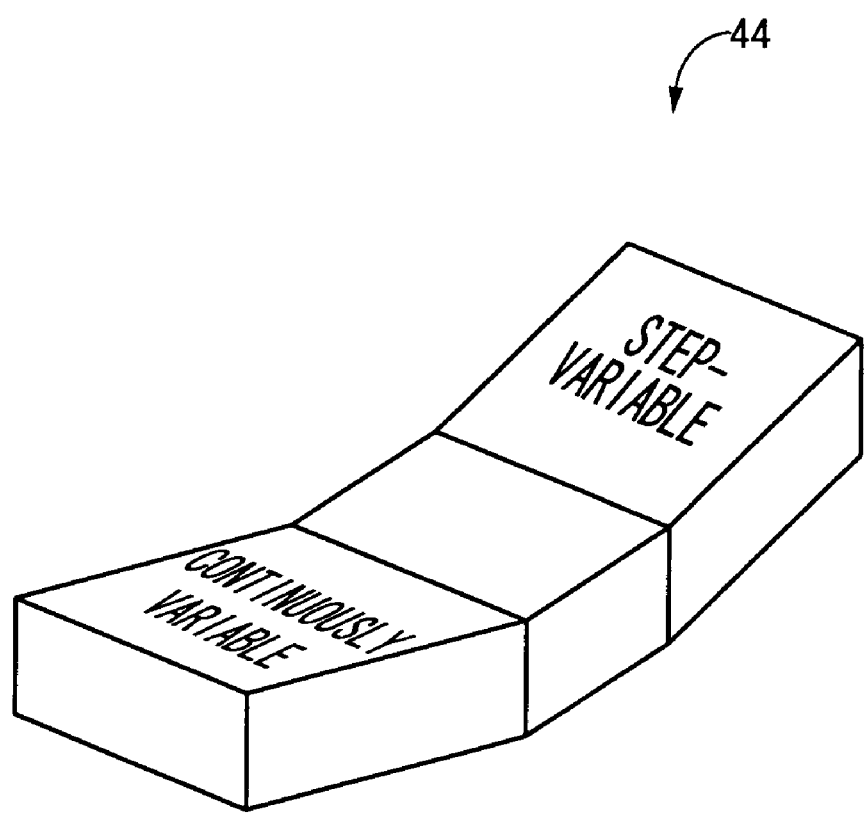
FIG. 17 is a view showing an example of a manually operable shifting-state selecting device in the form of a seesaw switch operated by a user to select the shifting state.

FIG. 17 shows an example of a seesaw switch 44 (hereinafter referred to as "switch 44") functioning as a shifting-state selecting device manually configured to be operable to select the differential state (non-locked state) and or non-differential state (locked state) of the power distributing mechanism 16, that is, to select the continuously-variable shifting state or step-variable shifting state of the transmission mechanism 10. This switch 44 permits the user to select the desired shifting state during running of the vehicle. The switch 44 has a continuously-variable-shifting running button labeled "STEP-VARIABLE" for running of the vehicle in the continuously-variable shifting state, and a step-variable-shifting running button labeled "CONTINUOUSLY-VARIABLE" for running of the vehicle in the step-variable shifting state, as shown in FIG. 17. When the continuously-variable-shifting running button is depressed by the user, the switch 44 is placed in a continuously-variable shifting position for selecting the continuously-variable shifting state in which the transmission mechanism 10 is operable as the electrically controlled continuously variable transmission. When the step-variable-shifting running button is depressed by the user, the switch 44 is placed in a step-variable shifting position for selecting in the step-variable shifting state in which the transmission mechanism is operable as the step-variable transmission.

In the preceding embodiments, the shifting state of the transmission mechanism 10 is automatically switched on the basis of the vehicle condition and according to the switching boundary line map shown in FIG. 6 by way of example. However, the shifting state of the transmission mechanism 10, 70 may be switched by a manual operation of the switch 44, in place of or in addition to the automatic switching operation. Namely, the switching control means 50 may be arranged to selectively place the transmission mechanism 10 in the continuously-variable shifting state or the step-variable shifting state, depending upon whether the switch 44 is placed in its continuously-variable shifting position or step-variable shifting position. For instance, the user manually operates the switch 44 to place the transmission mechanism 10 in the continuously-variable shifting state when the user likes the transmission mechanism 10 to operate as a continuously variable transmission or wants to improve the fuel economy of the engine, or alternatively in the step-variable shifting state when the user likes a rhythmical change of the engine speed as a result of a shifting action of the step-variable transmission.

The switch 44 may have a neutral position in which none of the continuously-variable and step-variable shifting states are selected. In this case, the switch 44 may be placed in its neutral position when the user has not selected the desired shifting state or likes the transmission mechanism 10 to be automatically placed in one of the continuously-variable and step-variable shifting states.

Where the shifting state of the transmission mechanism 10 is manually switched by the switch 44 rather than automatically switched, the determination as to whether the power distributing mechanism 16 or the differential portion 11 is placed in the continuously-variable shifting state or not is made in step S1 of the flow chart of FIG. 11, by determining whether the switch 44 has been manually operated to select the differential state of the power distributing mechanism 16, that is, the continuously-variable shifting state of the transmission mechanism 10.

While the preferred embodiments of this invention have been described in detail by reference to the accompanying drawings, it is to be understood that the present invention may be otherwise embodied.

In the preceding embodiments, the first-electric-motor temperature $TEMP_{M1}$ and the second-electric-motor speed $TEMP_{M2}$ are detected by the first-electric-motor temperature sensor 66 and the second-electric-motor temperature sensor 68. However, the temperatures $TEMP_{M1}$ and $TEMP_{M2}$ need not be detected directly by the sensors. For example, the first-electric-motor temperature $TEMP_{M1}$ and the second-electric-motor temperature $TEMP_{M2}$ may be estimated on the basis of an integral value of an electric current of the first electric motor M1 during its operation to generate an electric energy, and an electric current of the second electric motor M2 during its operation to produce a vehicle drive force.

While the vehicle is stationary, the electric motor temperature $TEMP_M$ and the cooling water temperature $TEMP_{HV}$ do not have a possibility of rising from the present levels. Therefore, it is not necessary to restrict the amount of electric energy transmitted through the electric path while the vehicle is stationary. In this respect, the upper limits TEMP1 and TEMP2 used to make the determination as to whether the amount of transmission of the electric energy through the electric path has increased to the thermal limit may be made higher while the vehicle is stationary, for preventing unnecessary restriction of the amount of transmission of the electric energy through the electric path while the vehicle is stationary.

In the preceding embodiments, the first-electric-motor temperature $TEMP_{M1}$ and the second-electric-motor temperature $TEMP_{M2}$ are used as the temperatures of the inverter 58 and other components associated with the electric path including the first and second electric motors M1, M2. However, the temperatures of the inverter 58 and the other components may be used as the temperatures of the components associated with the electric path. In this instance, the thermal-limit determining means 82 makes the determination as to whether the amount of transmission of the electric energy through the electric path has increased to the thermal limit, by determining, for example, whether the temperature of the inverter 58 is higher than a predetermined upper limit.

In the preceding embodiments, the thermal-limit determining means 82 makes the determination as to whether the amount of transmission of the electric energy through the electric path has increased to the thermal limit, by determining whether the cooling water temperature $TEMP_{HV}$ is higher than the upper limit. Where the hybrid cooling device 62 uses a cooling oil as the cooling fluid for cooling the components associated with the electric path, the cooling water temperature $TEMP_{HV}$ is replaced by a temperature $TEMP_{HV0}$ of the cooling oil. Where the working oil of the automatic transmission portion 20 is used to cool the first and second electric motors M1, M2, the thermal-limit determining means 82 may make the determination as to whether the amount of transmission of the electric energy through the electric path has increased to the thermal limit, by using the temperature $T_{OIL}$ of the working oil of the automatic transmission portion 20.

In the preceding embodiments, the differential-state determining means 80 (step S1 of FIG. 11) is configured to make the determination as to whether the power distributing mechanism 16 is placed in the differential state, by determining whether the vehicle condition lies in the continuously-variable shifting region defined by the switching control map of FIG. 6. However, the determination as to whether the power distributing mechanism 16 is placed in the differential state may be made by determining whether the transmission mechanism 10 is placed in the step-variable shifting state or the continuously-variable shifting state under the control of the switching control means 50.

In the illustrated embodiment, the power distributing mechanism 16 is selectively placed in one of the differential state and the non-differential state, so that the transmission mechanism 10, 70 is switchable between the continuously-variable shifting state in which the differential portion 11 functions as the electrically controlled continuously variable transmission, and the step-variable shifting state in which the differential portion 11 functions as the step-variable transmission. However, the principle of the present invention is applicable to any transmission mechanism which is not switchable to the step-variable shifting state, that is, in which the differential mechanism 11 is not provided with the switching clutch C0 and the switching brake B0 and functions only as the electrically controlled continuously variable transmission (electrically controlled differential device). In this case, the switching control means 50 and the high-speed-gear determining means 62 need not be provided. When the thermal-limit determining means 82 has determined that the amount of transmission of the electric energy through the electric path has increased to the thermal limit, the electric-energy restriction control means 84 commands the step-variable shifting control means 54 to shift down the automatic transmission portion 20, for restricting the amount of the electric energy transmitted through the electric path.

In the illustrated embodiments, the transmission mechanism 10, 70 is switchable between its continuously-variable shifting state and the step-variable shifting states by placing the differential portion 11 (power distributing mechanism 16) selectively in one of its differential state in which the differential portion is operable as the electrically controlled continuously variable transmission, and the non-differential state (locked state) in which the differential portion 11 is not operable as the step-variable transmission. However, the differential portion 11 placed in its differential state can be operable as the step-variable transmission the speed ratio of which is variable in steps rather than continuously. In other words, the differential and non-differential states of the differential portion 11 do not respectively correspond to the continuously-variable and step-variable shifting states of the transmission mechanism 10, 70, and therefore the differential portion 11 need not be switchable between the continuously-variable and step-variable shifting states. The principle of this invention is applicable to any transmission mechanism 10, 70 (differential portion 11 and power distributing mechanism 16) which is switchable between the differential and non-differential states.

In the illustrated embodiments, the first clutch C1 and the second clutch C2 constituting a part of the automatic transmission portion 20, 72, are provided as coupling devices operable to place the power transmitting path selectively in one of the power transmitting state and the power cut-off state, and these first and second clutches C1, C2 are disposed between the automatic transmission portion 20, 72 and the differential portion 11. However, the first and second clutches C1, C2 may be replaced by at least one coupling device operable to place the power transmitting path selectively in one of the power transmitting state and the power cut-off state. For instance, each of the above-indicated at least one coupling device may be connected to the output shaft 22, or to a suitable rotary member of the automatic transmission portion 20, 72. Further, the coupling device need not constitute a part of the automatic transmission portion 20, 72, and may be provided independently of the automatic transmission portion 20, 72.

In the power distributing mechanism 16 in the illustrated embodiments, the first carrier CA1 is fixed to the engine 8, and the first sun gear S1 is fixed to the first electric motor M1 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated embodiments, the first electric motor M1 and the second electric motor M2 are disposed coaxially with the input shaft 14, and are fixed to the first sun gear S1 and the power transmitting member 18, respectively. However, this arrangement is not essential. For example, the first and second electric motors M1, M2 may be operatively connected to the first sun gear S1 and the power transmitting member 18, respectively, through gears or belts.

Although the power distributing mechanism 16 in the illustrated embodiments is provided with the switching clutch C0 and the switching brake B0, the power distributing mechanism 16 need not be provided with both of the switching clutch C0 and brake B0. While the switching clutch C0 is provided to selectively connect the first sun gear S1 and the first carrier CA1 to each other, the switching clutch C0 may be provided to selectively connect the first sun gear S1 and the first ring gear R1 to each other, or selectively connect the first carrier CA1 and the first ring gear R1. Namely, the switching clutch C0 may be arranged to connect any two elements of the three elements of the first planetary gear set 24.

While the switching clutch C0 is engaged to establish the neutral position N in the transmission mechanism 10, 70 in the illustrated embodiments, the switching clutch C0 need not be engaged to establish the neutral position.

The hydraulically operated frictional coupling devices used as the switching clutch C0, switching brake B0, etc. in the illustrated embodiments may be replaced by a coupling device of a magnetic-power type, an electromagnetic type or a mechanical type, such as a powder clutch (magnetic powder clutch), an electromagnetic clutch and a meshing type dog clutch.

While the second electric motor M2 is connected to the power transmitting member 18 or the output shaft 22 in the illustrated embodiments, the second electric motor M2 may be connected to a rotary member of the automatic transmission portion 20.

In the illustrated embodiments, the step-variable transmission portion 20, 72 is disposed in the power transmitting path between the drive wheels 38, and the power transmitting member 18 which is the output member of the continuously-variable differential portion 11 or power distributing mechanism 16. However, the step-variable transmission portion 20, 72 may be replaced by any other type of power transmitting device such: an automatic transmission in the form of a continuously variable transmission (CVT); an automatic transmission which is a permanent-mesh parallel-two-axes type transmission well known as a manual transmission and which is automatically shifted by select cylinders and shift cylinders; and a manual transmission of synchronous meshing type which is manually shifted. Where the step-variable transmission portion is replaced by the continuously variable transmission (CVT), the transmission mechanism as a whole is placed in the step-variable shifting state when the power distributing mechanism 16 is placed in its fixed-speed-ratio shifting state. In the step-variable shifting state, the drive force is transmitted primarily through a mechanical power transmitting path, and not through an electric path. The above-indicated continuously variable transmission may be controlled to change its speed ratio to a selected one of a plurality of fixed values which correspond to respective gear position of a step-variable transmission and which are stored in a memory, so that the speed ratio of the transmission mechanism can be changed in steps. Further, the principle of this invention is applicable to a transmission mechanism not provided with the automatic transmission portion 20, 72. Where the automatic transmission portion 20, 72 is replaced by the continuously variable transmission (CVT) or the permanent-mesh type, or where the automatic transmission 20, 72 is not provided, a coupling device may be disposed in a power transmitting path between the power transmitting member 18 and the drive wheels 38, so that the power transmitting path is switchable between the power transmitting state and the power cut-off state, by engaging and releasing actions of the coupling device.

While the automatic transmission portion 20, 72 in the preceding embodiments is connected in series to the differential portion 11 through the power transmitting member 18, the automatic transmission portion 20, 72 may be mounted on and disposed coaxially with a counter shaft which is parallel to the input shaft 14. In this case, the differential portion 11 and the automatic transmission portion 20, 72 are operatively connected to each other through a suitable power transmitting device or a set of two power transmitting members such as a pair of counter gears, and a combination of a sprocket wheel and a chain.

The power distributing mechanism 16 provided as a differential mechanism in the preceding embodiments may be replaced by a differential gear device including a pinion rotated by the engine 8, and a pair of bevel gears which mesh with the pinion and which are respectively operatively connected to the first electric motor M1 and the power transmitting member 18.

While the power distributing mechanism 16 in the illustrated embodiments is constituted by one planetary gear set 24, it may be constituted by two or more planetary gear sets so that the power distributing mechanism 16 is operable as a transmission having three or more gear positions in the non-differential state (fixed-speed-ratio shifting state).

In the illustrated embodiments, the manually operable shifting device 46 is provided with the shift lever 48 manually operable to select one of a plurality of operating positions. However, the shift lever 48 may be replaced by pushbutton switches, a slide-type or any other type of switch manually operable to select a desired one of a plurality of operating positions, or by devices not operated by hand, such as a device operated in response to a voice of the vehicle operator or operated by foot, to select one of a plurality of operating positions. Although the shift lever 48 has the manual forward-drive position M for selecting the number of the forward-drive gear positions available for automatic shifting of the automatic transmission portion 20, 72, the shift lever 48 placed in the manual forward-drive position M may be used to manually shift up or down the automatic transmission portion 20, 72, within the range from the first gear position through the fourth gear position, by operating the shift lever 48 from the position M to the shift-up position "+" or shift-down position "−".

While the switch 44 is of a seesaw type switch in the preceding embodiments, the seesaw switch 44 may be replaced by a single pushbutton switch, two pushbutton switches that are selectively pressed into operated positions, a lever type switch, a slide-type switch or any other type of switch or switching device that is operable to select a desired one of the continuously-variable shifting state (differential state) and the step-variable shifting state (non-differential state). The seesaw switch 44 may or may not have a neutral position. Where the seesaw switch 44 does not have the neutral position, an additional switch may be provided to enable and disable the seesaw switch 44. The function of this additional switch corresponds to the neutral position of the seesaw switch 44. The seesaw switch 44 may be replaced by a switching device operable by a voice generated by the vehicle operator or a foot of the vehicle operator, rather than by hand, to select one of the continuously-variable shifting state (differential state) and the step-variable shifting state (non-differential state).

It is to be understood that the embodiments of the invention have been descried for illustrative purpose only, and that the present invention may be embodied with various changes and modifications which may occur to those skilled in the art.

The invention claimed is:

1. A control apparatus for a vehicular drive system including a continuously-variable transmission portion operable as an electrically controlled continuously variable transmission and having a differential mechanism operable to distribute an output of an engine to a first electric motor and a power transmitting member, a second electric motor configured to transmit power to a drive wheel and to receive power from the drive wheel, and a differential limiting device provided in said differential mechanism and operable to limit a differential function of the differential mechanism, for limiting an operation of said continuously-variable transmission portion as the electrically controlled continuously variable transmission, said control apparatus comprising:

electric-energy restriction control means for placing said differential mechanism in a non-differential state or a partially power transmitting state, when the amount of the electric energy transmitted through the continuously-variable transmission portion operating as the electrically controlled continuously variable transmission has increased to a predetermined thermal limit.

2. The control apparatus according to claim 1, wherein a transmission portion is disposed in a power transmitting path between the engine and the drive wheel, and said electric-energy restriction control means is configured to command said transmission portion to perform a shift-down action when said differential mechanism cannot be placed in the non-differential state.

3. The control apparatus according to claim 2, wherein said electric-energy restriction control means is configured to reduce an output torque of said engine when said differential mechanism cannot be placed in the non-differential state, and when said shift-down action of said transmission portion cannot be performed.

4. The control apparatus according to claim 1, further comprising thermal-limit determining means for determining that said amount of the transmitted electric energy has increased to said predetermined thermal limit, when at least one of coil temperatures of said first and second electric motors is higher than a predetermined upper limit.

5. The control apparatus according to claim 4, wherein said thermal-limit determining means determines whether said amount of transmission of the electric energy has increased to said predetermined thermal limit or not, on the basis of an estimated value of said at least one of said coil temperatures at a moment which is a predetermined length of time after a present moment.

6. The control apparatus according to claim 1, further comprising thermal-limit determining means for determining that said amount of the transmitted electric energy has increased to said predetermined thermal limit, when a temperature of a cooling fluid for cooling at least one of said first and second electric motors is higher than a predetermined upper limit.

7. The control apparatus according to claim 6, wherein said thermal-limit determining means determines whether said amount of the transmitted electric energy has increased to said predetermined thermal limit or not, on the basis of an estimated value of the temperature of said cooling fluid at a moment which is a predetermined length of time after a present moment.

8. The control apparatus according to claim 2, wherein said differential limiting device includes a frictional coupling device operable to limit the differential function of said differential mechanism, and said differential mechanism is placed in the non-differential state or the partially power transmitting state when said frictional coupling device is placed in an engaged state, said control apparatus further comprising differential-limitation feasibility determining means for determining whether the differential mechanism can be placed in the non-differential state, on the basis of an operating condition of said frictional coupling device.

9. The control apparatus according to claim 3, further comprising shift-down-action feasibility determining means for determining whether said shift-down action of said transmission portion can be performed, on the basis of at least one of an operating condition of said engine and an operating condition of the transmission portion.

10. The control apparatus according to claim 3, further comprising engine-torque limiting means for reducing the output torque of the engine, and wherein said electric-energy restriction control means commands said engine-torque limiting means to reduce the output torque of said engine when it is determined that the shift-down action of said transmission portion cannot be performed.

11. The control apparatus according to claim 4, further comprising thermal-limit determining means for determining whether the amount of the transmitted electric energy has increased to the predetermined thermal limit, and wherein said thermal-limit determining means increases said predetermined upper limit while the vehicle is stationary.

12. The control apparatus according to claim 1, further comprising thermal-limit determining means for determining that the amount of the transmitted electric energy has increased to the predetermined thermal limit, when a temperature of an inverter operable to control an electric current of the first electric motor or second electric motor is higher than a predetermined value.

13. The control apparatus according to claim 1, further comprising thermal-limit determining means for determining that the amount of the transmitted electric energy has increased to the predetermined thermal limit, when a temperature of a cooling oil for said continuously-variable transmission portion or said differential portion is higher than a predetermined value.

14. The control apparatus according to claim 1, wherein said differential limiting device includes a plurality of frictional coupling devices operable to selectively place said differential mechanism in said non-differential state or said partially power transmitting state.

15. A control apparatus for a vehicular drive system including a continuously-variable transmission portion operable as an electrically controlled continuously variable transmission and having a differential mechanism operable to distribute an output of an engine to a first electric motor and a power transmitting member, and a second electric motor configured to transmit power to a drive wheel and to receive power from the drive wheel, and further including a transmission portion disposed in a power transmitting path between the engine and the drive wheel, said control apparatus comprising:

electric-energy restriction control means for commanding said transmission portion to be shifted down, when the amount of the electric energy transmitted through the continuously-variable transmission portion operating as the electrically controlled continuously variable transmission has increased to a predetermined thermal limit.

16. The control apparatus according to claim 15, further comprising shift-down-action feasibility determining means for determining whether said shift-down action of said transmission portion can be performed, on the basis of at least one of an operating condition of said engine and an operating condition of the transmission portion.

17. The control apparatus according to claim 15, further comprising thermal-limit determining means for determining that said amount of transmission of the electric energy has increased to said predetermined thermal limit, when at least one of coil temperatures of said first and second electric motors is higher than a predetermined upper limit.

18. The control apparatus according to claim 17, wherein said thermal-limit determining means determines whether said amount of transmission of the electric energy has increased to said predetermined thermal limit or not, on the basis of an estimated value of said at least one of said coil temperatures at a moment which is a predetermined length of time after a present moment.

19. The control apparatus according to claim 15, further comprising thermal-limit determining means for determining that said amount of transmission of the electric energy has increased to said predetermined thermal limit, when a temperature of a cooling fluid for cooling at least one of said first and second electric motors is higher than a predetermined upper limit.

20. The control apparatus according to claim 19, wherein said thermal-limit determining means determines whether said amount of transmission of the electric energy has increased to said predetermined thermal limit or not, on the basis of an estimated value of the temperature of said cooling fluid at a moment which is a predetermined length of time after a present moment.

21. The control apparatus according to claim 15, further comprising thermal-limit determining means for determining that the amount of the transmitted electric energy has increased to the predetermined thermal limit, when a temperature of an inverter operable to control an electric current of the first electric motor or second electric motor is higher than a predetermined value.

22. The control apparatus according to claim 15, further comprising thermal-limit determining means for determining that the amount of the transmitted electric energy has increased to the predetermined thermal limit, when a temperature of a cooling oil for said continuously-variable transmission portion or said differential portion is higher than a predetermined value.

23. A control apparatus for a vehicular drive system including a differential portion operable as an electrically controlled continuously variable transmission and having a differential mechanism operable to distribute an output of an engine to a first electric motor and a power transmitting member, a second electric motor configured to transmit power to a drive wheel and to receive power from the drive wheel, and a differential limiting device provided in said differential mechanism and operable to limit a differential function of the differential mechanism, for limiting an operation of said differential portion as the electrically controlled continuously variable transmission, said control apparatus comprising:

electric-energy restriction control means for placing said differential mechanism in a non-differential state or a partially power transmitting state, when the amount of the electric energy transmitted through the differential portion operating as the electrically controlled continuously variable transmission has increased to a predetermined thermal limit.

24. The control apparatus according to claim 23, wherein a transmission portion is disposed in a power transmitting path between the engine and the drive wheel, and said electric-energy restriction control means is configured to command said transmission portion to perform a shift-down action when said differential mechanism cannot be placed in the non-differential state.

25. The control apparatus according to claim 24, wherein said electric-energy restriction control means is configured to reduce an output torque of said engine when said differential mechanism cannot be placed in the non-differential state, and when said shift-down action of said transmission portion cannot be performed.

26. The control apparatus according to claim 23, further comprising thermal-limit determining means for determining that said amount of transmission of the electric energy has increased to said predetermined thermal limit, when at least one of coil temperatures of said first and second electric motors is higher than a predetermined upper limit.

27. The control apparatus according to claim 26, wherein said thermal-limit determining means determines whether said amount of transmission of the electric energy has increased to said predetermined thermal limit or not, on the basis of an estimated value of said at least one of said coil temperatures at a moment which is a predetermined length of time after a present moment.

28. The control apparatus according to claim 23, further comprising thermal-limit determining means for determining that said amount of transmission of the electric energy has increased to said predetermined thermal limit, when a temperature of a cooling fluid for cooling at least one of said first and second electric motors is higher than a predetermined upper limit.

29. The control apparatus according to claim 28, wherein said thermal-limit determining means determines whether said amount of transmission of the electric energy has increased to said predetermined thermal limit or not, on the basis of an estimated value of the temperature of said cooling fluid at a moment which is a predetermined length of time after a present moment.

30. The control apparatus according to claim 24, wherein said differential limiting device includes a frictional coupling device operable to limit the differential function of said differential mechanism, and said differential mechanism is placed in the non-differential state or the partially power transmitting state when said frictional coupling device is placed in an engaged state, said control apparatus further comprising differential-limitation feasibility determining means for determining whether the differential mechanism can be placed in the non-differential state, on the basis of an operating condition of said frictional coupling device.

31. The control apparatus according to claim 25, further comprising shift-down-action feasibility determining means for determining whether said shift-down action of said transmission portion can be performed, on the basis of at least one of an operating condition of said engine and an operating condition of the transmission portion.

32. The control apparatus according to claim 23, further comprising thermal-limit determining means for determining that the amount of the transmitted electric energy has increased to the predetermined thermal limit, when a temperature of an inverter operable to control an electric current of the first electric motor or second electric motor is higher than a predetermined value.

33. The control apparatus according to claim 23, further comprising thermal-limit determining means for determining that the amount of the transmitted electric energy has increased to the predetermined thermal limit, when a temperature of a cooling oil for said continuously-variable transmission portion or said differential portion is higher than a predetermined value.

34. The control apparatus according to claim 23, wherein said differential limiting device includes a plurality of frictional coupling devices operable to selective place said differential mechanism in said non-differential state or said partially power transmitting state.

35. A control apparatus for a vehicular drive system including a differential portion operable as an electrically controlled continuously variable transmission and having a differential mechanism operable to distribute an output of an engine to a first electric motor and a power transmitting member, and a second electric motor configured to transmit power to a drive wheel and to receive power from the drive wheel, and further including a transmission portion disposed in a power transmitting path between the engine and the drive wheel, said control apparatus comprising:

electric-energy restriction control means for commanding said transmission portion to be shifted down, when the amount of the electric energy transmitted through the differential portion operating as the electrically controlled continuously variable transmission has increased to a predetermined thermal limit.

36. The control apparatus according to claim 35, further comprising thermal-limit determining means for determining that said amount of transmission of the electric energy has increased to said predetermined thermal limit, when at least one of coil temperatures of said first and second electric motors is higher than a predetermined upper limit.

37. The control apparatus according to claim 36, wherein said thermal-limit determining means determines whether said amount of transmission of the electric energy has increased to said predetermined thermal limit or not, on the basis of an estimated value of said at least one of said coil temperatures at a moment which is a predetermined length of time after a present moment.

38. The control apparatus according to claim 35, further comprising thermal-limit determining means for determining that said amount of transmission of the electric energy has increased to said predetermined thermal limit, when a temperature of a cooling fluid for cooling at least one of said first and second electric motors is higher than a predetermined upper limit.

39. The control apparatus according to claim 38, wherein said thermal-limit determining means determines whether said amount of transmission of the electric energy has increased to said predetermined thermal limit or not, on the basis of an estimated value of the temperature of said cooling fluid at a moment which is a predetermined length of time after a present moment.

40. The control apparatus according to claim 35, further comprising thermal-limit determining means for determining that the amount of the transmitted electric energy has increased to the predetermined thermal limit, when a temperature of an inverter operable to control an electric current of the first electric motor or second electric motor is higher than a predetermined value.

41. The control apparatus according to claim 35, further comprising thermal-limit determining means for determining that the amount of the transmitted electric energy has increased to the predetermined thermal limit, when a temperature of an inverter operable to control an electric current of the first electric motor or second electric motor is higher than a predetermined value.

42. The control apparatus according to claim 35, further comprising thermal-limit determining means for determining that the amount of the transmitted electric energy has increased to the predetermined thermal limit, when a temperature of a cooling oil for said continuously-variable transmission portion or said differential portion is higher than a predetermined value.

* * * * *